US012755147B2

(12) United States Patent
Kim

(10) Patent No.: US 12,755,147 B2
(45) Date of Patent: Oct. 6, 2026

(54) ELECTRONIC APPARATUS FOR TRAINING CLASSIFICATION NETWORK AND OPERATING METHOD THEREOF, AND ELECTRONIC APPARATUS USING CLASSIFICATION NETWORK

(71) Applicant: SK hynix Inc., Icheon-si (KR)

(72) Inventor: Dong Ik Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 1102 days.

(21) Appl. No.: 17/750,619

(22) Filed: May 23, 2022

(65) Prior Publication Data

US 2023/0214644 A1 Jul. 6, 2023

(30) Foreign Application Priority Data

Jan. 6, 2022 (KR) ........................ 10-2022-0002186

(51) Int. Cl.

| | |
|---|---|
| ***G06N 3/08*** | (2023.01) |
| ***G06N 3/048*** | (2023.01) |
| ***G06V 10/764*** | (2022.01) |
| ***G06V 10/82*** | (2022.01) |

(52) U.S. Cl.

CPC ............... *G06N 3/08* (2013.01); *G06N 3/048* (2023.01); *G06V 10/764* (2022.01); *G06V 10/82* (2022.01)

(58) Field of Classification Search

CPC ........ G06N 3/0464; G06N 3/048; G06N 3/08; G06N 3/084; G06N 3/09; G06V 10/454; G06V 10/764; G06V 10/82; G06V 20/70

See application file for complete search history.

(56) References Cited

U.S. PATENT DOCUMENTS 9,697,444 B2 7/2017 Wu et al.
2015/0036920 A1* 2/2015 Wu ...................... G06V 10/764 382/156
2015/0169983 A1* 6/2015 Kang .................. G06V 10/464 382/154
2018/0068198 A1* 3/2018 Savvides .............. G06V 40/161
2018/0144209 A1* 5/2018 Kim ......................... G06N 3/04

FOREIGN PATENT DOCUMENTS

CN 109255769 A 1/2019
CN 113516133 A 10/2021
KR 102030132 B1 10/2019

* cited by examiner

*Primary Examiner* — Brent Johnston Hoover

(74) *Attorney, Agent, or Firm* — WILLIAM PARK AND ASSOCIATES LTD.

(57) ABSTRACT

An electronic apparatus includes a memory for storing a classification network including a plurality of feature extraction layers. The electronic apparatus also includes a processor for acquiring a class score corresponding to an object, which is output from the classification network, by inputting a training image including the object to the classification network, acquiring a final loss value, based on a plurality of activation maps respectively output from the plurality of feature extraction layers and the class score, and controlling the classification network, based on the final loss value.

20 Claims, 23 Drawing Sheets

725

| ACTIVATION FUNCTION | f(x) | RANGE |
|---|---|---|
| Sigmoid | $\frac{1}{1+e^{-x}}$ | (0, 1) |
| tanh | tanh(x) | (-1, 1) |
| ReLU | max(0, x) | (0, ∞) |
| Leaky ReLU | max(0.1x, x) | (-∞ , ∞) |
| ELU | $\begin{cases} \alpha(e^{x}-1), & x < 0 \\ x, & x \geq 0 \end{cases}$ | (-1, ∞) |
| maxout | $\max(w1^{T} \times x + b1, w2^{T} \times x + b2)$ | — |

925

| POOLING FUNCTION | g(Z) |
|---|---|
| max | max(Z) |
| min | min(Z) |
| average | average(Z) |

$$\mathrm{Softmax}(z_k) = \frac{e^{z_k}}{\sum_{i=1}^{n} e^{z_i}}$$

$$\text{loss\_softmax} = \sum_{i=1}^{n}(s_i - t_i)^2 \text{ or } \sum_{i=1}^{n}|s_i - t_i|$$

(1) loss_AM = loss_seg1 + loss_seg2 + $\cdots$ + loss_segN (2) loss_f = $\alpha \times$ loss_softmax + $(1-\alpha) \times$ loss_AM

ELECTRONIC APPARATUS FOR TRAINING CLASSIFICATION NETWORK AND OPERATING METHOD THEREOF, AND ELECTRONIC APPARATUS USING CLASSIFICATION NETWORK

CROSS-REFERENCE TO RELATED APPLICATION

The present application claims priority under 35 U.S.C. § 119(a) to Korean patent application number 10-2022-0002186 filed on Jan. 6, 2022, in the Korean Intellectual Property Office, the entire disclosure of which is incorporated by reference herein.

BACKGROUND

1. Technical Field

The present disclosure generally relates to a classification network, and more particularly, to an electronic apparatus for training a classification network and an operating method thereof, and an electronic apparatus using a trained classification network.

2. Related Art

Recently, with the development of semiconductor and communication technologies, an Artificial Neural Network (ANN) technique based on large-scale data has been used. An ANN is a machine training model imitating a biological structure. The ANN is configured with multiple layers, and has a network structure in which an artificial neuron (node) included in one layer is connected to an artificial neuron included in a next layer with a specific strength (weighted parameter). In the ANN, the weighted parameter may be changed through training.

A Convolution Neural Network (CNN) model as a kind of ANN is used for image analysis, image classification, and the like. Particularly, in the case of a classification network using the CNN, an object included in an input image may be classified as a specific class. In general, because only information on a class is used for training of the classification network, a problem may occur in that classification performance of the classification network is deteriorated, such as overfitting of a classification result of the classification network when an erroneous position is trained.

SUMMARY

Some embodiments may provide an electronic apparatus for training a classification network having improved classification accuracy and an operating method of the electronic apparatus.

In accordance with an embodiment of the present disclosure, an electronic apparatus includes: a memory configured to store a classification network including a plurality of feature extraction layers; and a processor configured to acquire a class score corresponding to an object, which is output from the classification network, by inputting a training image including the object to the classification network, acquire a final loss value, based on a plurality of activation maps respectively output from the plurality of feature extraction layers and the class score, and control the classification network, based on the final loss value.

In accordance with another embodiment of the present disclosure, an electronic apparatus includes: a memory storing a classification network that includes a plurality of feature extraction layers and is trained to classify an object included in an image; and a processor configured to acquire a class score representing a score with which an object included in a received input image is matched to each of a plurality of classes by inputting the input image to the classification network, wherein the trained classification network is a neural network trained based on a weight calculation of a softmax loss value corresponding to a training image input to the classification network and an activation map loss value acquired using activation maps respectively output from the plurality of feature extraction layers.

Also in accordance with the present disclosure, a method of operating an electronic apparatus includes: inputting a training image including an object to a classification network including a plurality of feature extraction layers; acquiring a class score corresponding to the object, which is output from the classification network; acquiring a final loss value, based on a binary image corresponding to the training image, a plurality of activation maps respectively output from the plurality of feature extraction layers, and the class score; and controlling the classification network, based on the final loss value.

BRIEF DESCRIPTION OF THE DRAWINGS

Example embodiments will now be described more fully hereinafter with reference to the accompanying drawings; however, they may be embodied in different forms and should not be construed as being limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it might be the only element between the two elements, or one or more intervening elements may also be present. Like reference numerals refer to like elements throughout the drawings.

DETAILED DESCRIPTION

The specific structural or functional descriptions disclosed herein are merely illustrative for the purpose of describing embodiments according to the concept of the present disclosure. The embodiments according to the concept of the present disclosure can be implemented in various forms, and should be construed as being limited to the embodiments set forth herein.

Figure 1:
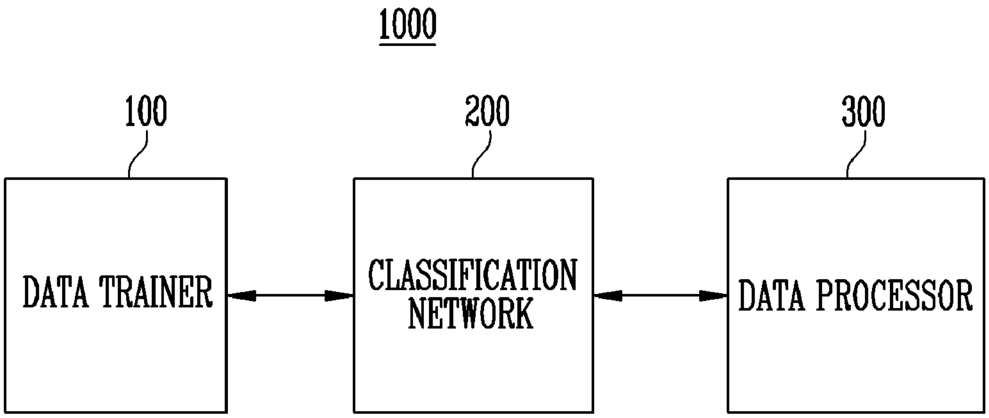
FIG. 1 is a diagram illustrating an electronic apparatus in accordance with an embodiment of the present disclosure.

FIG. 1 is a diagram illustrating an electronic apparatus in accordance with an embodiment of the present disclosure.

Referring to FIG. 1, a first electronic apparatus 1000 in accordance with an embodiment of the present disclosure may include a data trainer 100, a classification network 200, and a data processor 300. For some embodiments, the data trainer 100, the classification network 200, and the data processor 300 may represent circuits.

The first electronic apparatus 1000 may be a sever, a data center, a cloud server, a workstation, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, a set top box, a smart speaker, an intelligent speaker, a game console, a television, a refrigerator, an air conditioner, an air purifier, a smart mirror, a smart window, an electronic frame, and the like. The wearable device may be a smart watch, a ring, a bracelet, an anklet, a necklace, glasses, a contact lens, a head-mounted device (HMD), a skin pad, an electronic tattoo, or a bio-implantable type circuit, or the like.

The data trainer 100 may train the classification network 200. The data trainer 100 may train the classification network 200 through training image. Specifically, the data trainer 100 may input the training image to the classification network 200, and train the classification network 200, based on a class score output from the classification network 200 and an activation map output from the classification network 200.

The classification network 200 may include a plurality of layers. The plurality of layers may have a structure in which the plurality of layers are connected in series according to an order thereof. For example, the plurality of layers may have a structure in which an output of a first layer is processed as an input of a second layer as a next order. In an embodiment, the classification network 200 may be a convolution neural network model. For example, each layer may be one of a convolution layer, an activation function layer, a pooling layer, a fully connected layer, and a softmax layer.

When an image is input, the classification network 200 may output a class score. Specifically, when an image including an object is input, the classification network 200 may output a class score representing a score with which the object is matched to each of a plurality of classes.

The image may be a training image or an input image. The training image may represent data for training the classification network 200 to classify an object included in the training image, and the input image may represent data for classifying an object included in the input image by using the trained classification network 200. That is, the training image is an image input to the classification network 200 in a process of training the classification network 200, and the input image is an image input to the classification network 200 after the classification network 200 is trained. The class score may include a score for each class. For example, the class score may include a score of a first class and a score of a second class. That is, the class score may include a plurality of scores. The score may represent a degree to which the object is matched to a corresponding class or a probability that the object will be classified as the corresponding class or a probability that the object will belong to the corresponding class. A label may be preset to the class. For example, a label called 'cat' may be preset to the first class, and a label called 'dog' may be preset to the second class. The label set to a class and the number of classes may be variously modified and embodied. That the classification network 200 is trained may mean that a weighted parameter in the layers included in the classification network 200, a bias between layers adjacent to each other, or a bias between nodes connected to each other in the layers is determined or updated.

The data processor 300 may classify an object included in an image as a specific class by using the classification network 200. For example, a case where the first class is preset as a cat and the second class is preset as a dog is assumed. The data processor 300 may input an image to the classification network 200, and classify an object included in the image as one of the first class and the second class according to a voltage output from the classification network 200. When the object is classified as the first class, the data processor 300 may identify that the object is the cat preset as the first class.

Meanwhile, although a case where the data trainer 100, the classification network 200, and the data processor 300 are all included in the first electronic apparatus 1000 has been described in FIG. 1, this is merely an embodiment, and may be embodied in various forms, such as a case where at least one of the data trainer 100, the classification network 200, and the data processor 300 is mounted in a separate apparatus. In an embodiment, a second electronic apparatus 1100 (see FIG. 2A) may include the data trainer 100 and the classification network 200. In an embodiment, a third electronic apparatus 1200 (see FIG. 12A) may include the classification network 200 and the data processor 300.

Hereinafter, various embodiments of the present disclosure will be described in detail with reference to the accompanying drawings.

Figure 2A:
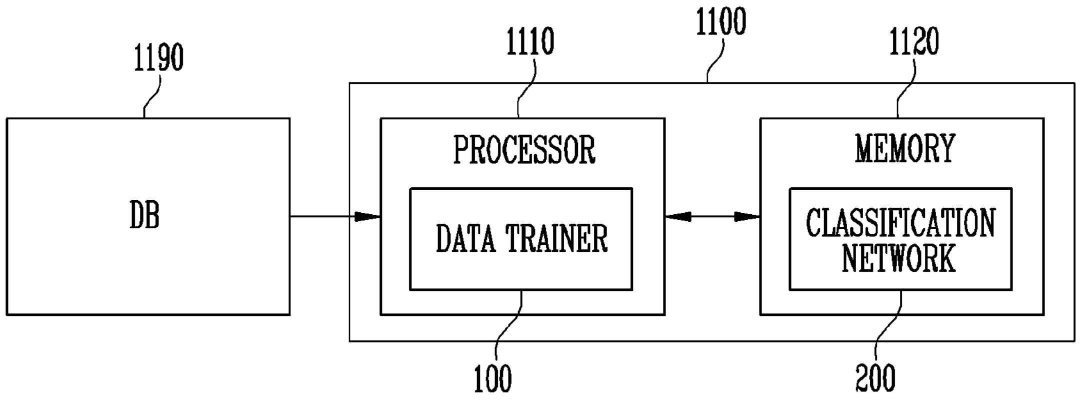
FIG. 2A is a diagram illustrating an electronic apparatus for training a classification network in accordance with an embodiment of the present disclosure.

FIG. 2A is a diagram illustrating an electronic apparatus for training a classification network in accordance with an embodiment of the present disclosure.

Referring to FIG. 2A, the second electronic apparatus 1100 in accordance with the embodiment of the present disclosure may include a processor 1110 and a memory 1120.

The processor 1110 may process data input to each of the plurality of layers included in the classification network 200 stored in the memory 1120 by a rule or calculation defined in each layer. The processor 1110 may update weighted parameters included in some layers among the plurality of layers through training. To this end, the processor 1110 may be implemented as a general purpose processor such as a Central Processing Unit (CPU) or an Application Processor Unit (APU), a graphic dedicated processor such as a Graphic Processing Unit (GPU), an artificial intelligence dedicated processor such as a Neural Processing Unit (NPU), or the like. The processor 1110 may be configured with one or a plurality of processor units.

The memory 1120 may store various information such as data, information or instructions in an electrical or magnetic form. To this end, the memory 1120 may be implemented as at least one hardware among a nonvolatile memory, a volatile memory, a flash memory, a hard disk drive (HDD) or solid state drive (SSD), a RAM, a ROM, and the like.

The memory 1120 may store the classification network 200. The memory 1120 may store weighted parameters updated according to training, whenever the classification network 200 is trained.

A database 1190 may store a large quantity of training images. The database 1190 may provide the large quantity of training images to the processor 1110. In an embodiment, the database 1190 may be variously modified such as a case where the database 1190 separately exists the outside of the second electronic apparatus 1100 or a case where the database 1190 is included inside the second electronic apparatus 1100. Each training image may include an object. The training image may be an image acquired by photographing the object or an image generated by using graphic software. For example, the object may be a living thing such as a cat, a dog, a person, or a tree; a thing such as a chair, a desk, a rock, a window, or a streetlamp; or the like. The training image may include a plurality of pixel values arranged in row and column directions. The training image may include pixel values of a first color channel, pixel values of a second color channel, and pixel values of a third color channel. For example, the first color channel may be a red channel, the second color channel may be a green channel, and the third color channel may be a blue channel. That is, the training image may be an RGB image. Sizes of the pixel values of the first color channel, the pixel values of the second color channel, and the pixel values of the third color channel may all be equal to one another. The size may represent a number of pixel values arranged in the row and column directions. Each of the pixel values included in the training image may be a value included in a range of 0 to 255. However, this is merely an embodiment, and each of the pixels may be variously modified and embodied, such as a case where each of the pixel values included in the training image may be a value included in a range of 0 to 1023.

In an embodiment, the database 1190 may further store a binary image corresponding to each training image. The binary image may include pixel values having one color channel. For example, each of the pixel values included in the binary image may be a value of 0 or 1. In another example, each of the pixel values included in the binary image may be a value of 0 or 255. The binary image may be an image representing a position of an object. The binary image may be used in training the classification network 200 to accurately identify a position of an object included in an image input to the classification network 200. The database 1190 may provide, to the processor 1110, a binary image corresponding to a training image, together with the training image.

In an embodiment, the processor 1110 may train the classification network 200 by using each of the training images received from the database 1190.

The processor 1110 may acquire a class score output from the classification network 200 by inputting a training image to the classification network 200. The training image may include an object. The class score may correspond to the object. The classification network 200 may include a plurality of feature extraction layers.

The processor 1110 may acquire a final loss value, based on a plurality of activation maps output from each of the plurality of feature extraction layers, and the class score. The plurality of activation maps may be output from each of the plurality of feature extraction layers, when a training image is input to a first layer among the plurality of feature extraction layers. The final loss value may be acquired based on an activation map loss value and a softmax loss value. The activation map loss value may be acquired based on each of the plurality of activation maps and a binary image. The softmax loss value may be acquired based on a class score and a reference score. The softmax loss value may represent an error of the class score.

The processor 1110 may control the classification network 200 by using the final loss value. That the classification network 200 is controlled may mean that the classification network 200 is trained. That the classification network 200 is trained may mean that at least one of a plurality of weighted parameters included in each of the plurality of feature extraction layers is updated.

In an embodiment, the processor 1110 may include the data trainer 100. At least some operations of the processor 1110 may be performed by the data trainer 100. This will be described in more detail with reference to FIG. 2B.

Figure 2B:
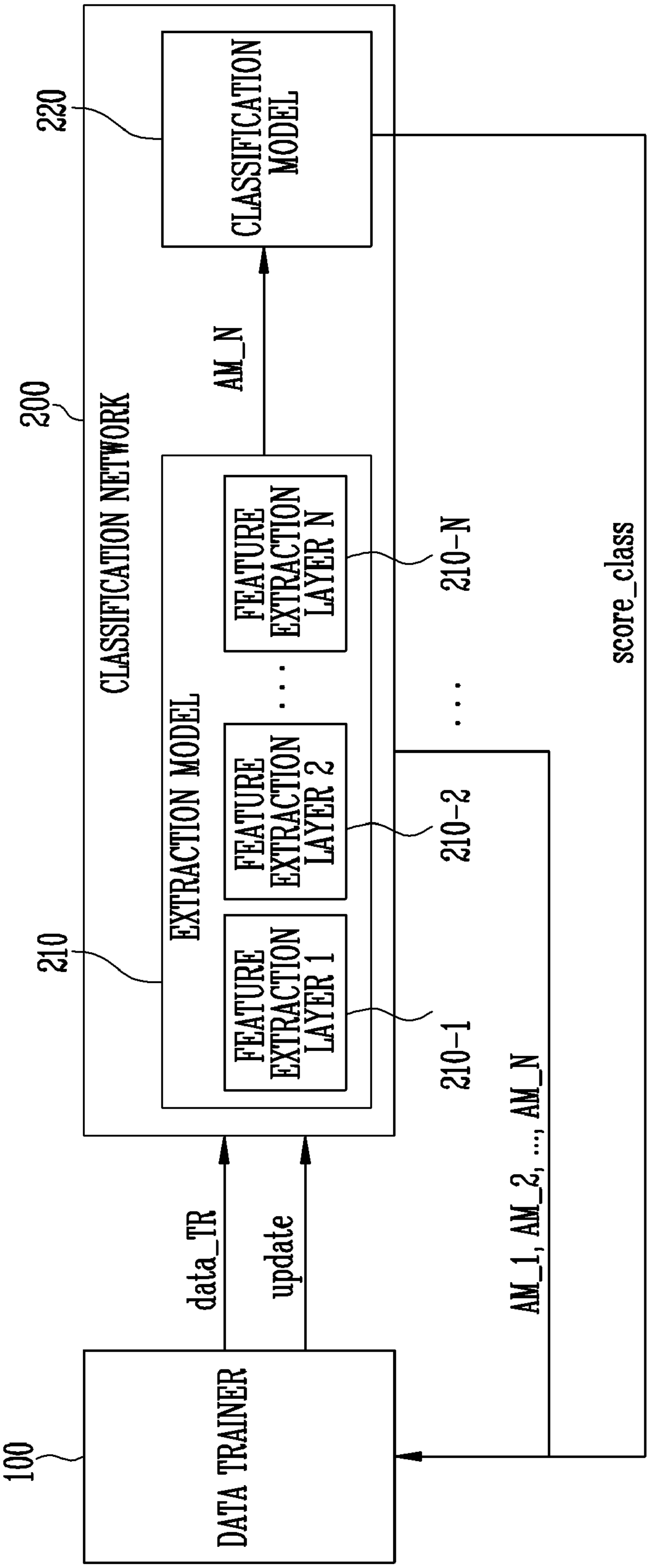
FIG. 2B is a diagram illustrating a method of training the classification network in accordance with an embodiment of the present disclosure.

FIG. 2B is a diagram illustrating a method of training the classification network in accordance with an embodiment of the present disclosure.

Referring to FIG. 2B, the data trainer 100 may input a training image data_TR to the classification network 200. The training image data_TR may include an object. Input/output processing of data, which is shown in FIG. 2B, may be performed by the data trainer 100.

The classification network 200 may include an extraction model 210 and a classification model 220. The extraction model 210 and the classification model 220 may have a structure in which the extraction model 210 and the classification model 220 are connected in series. For example, the extraction model 210 and the classification model 220 may have a structure in which the extraction model 210 and the classification model 220 are connected to each other such that output data of the extraction model 210 is processed as input data of the classification model 220.

The extraction model 210 may be a model for extracting a feature of input data. Specifically, the extraction model 210 may include a plurality of feature extraction layers 210-1 to 210-N. The plurality of feature extraction layers 210-1 to 210-N may have a structure in which the plurality of feature extraction layers 210-1 to 210-N are connected in series.

Each of the plurality of feature extraction layers 210-1 to 210-N may output an activation map when data is input. The activation map output from each feature extraction layer may be data obtained by magnifying a unique feature in data input to the feature extraction layer. For example, the activation map may be an image obtained by processing an image input from the feature extraction layer. Meanwhile, a number of values included in the activation map may be further decreased than a number of values included in the input data.

In an embodiment, the plurality of feature extraction layers 210-1 to 210-N may include a first feature extraction layer 210-1 and a second feature extraction layer 210-2, which are connected in series. The first feature extraction layer 210-1 may output a first activation map AM_1 with respect to the training image data_TR. That is, the first feature extraction layer 210-1 may output the first activation map AM_1 when the training image data_TR is input. The second feature extraction layer 210-2 may output a second activation map AM_2 with respect to the first activation map AM_1. That is, the second feature extraction layer 210-2 may output the second activation map AM_2 when the first activation map AM_1 is input. As described above, an output data of the first feature extraction layer 210-1 may be processed as input data of the second feature extraction layer 210-2. In an embodiment, the number of the feature extraction layers 210-1 to 210-N may be variously modified and embodied, such as one or three or more. For some embodiments, any or all of the classification network 200, the extraction model 210, the feature extraction layers 210-1 to 210-N included in the extraction model 210 and the classification model 220 may represent circuits.

The classification model 220 may be a model for classifying a class from a feature of input data. The classification model 220 may output a class score score_class when an activation map is input.

The data trainer 100 may train the classification network 200, based on the class score score_class output from the classification model 220 and a plurality of activation maps AM_1 to AM_N respectively output from the plurality of feature extraction layers 210-1 to 210-N. This will be described in detail with reference to FIG. 3.

Figure 3:
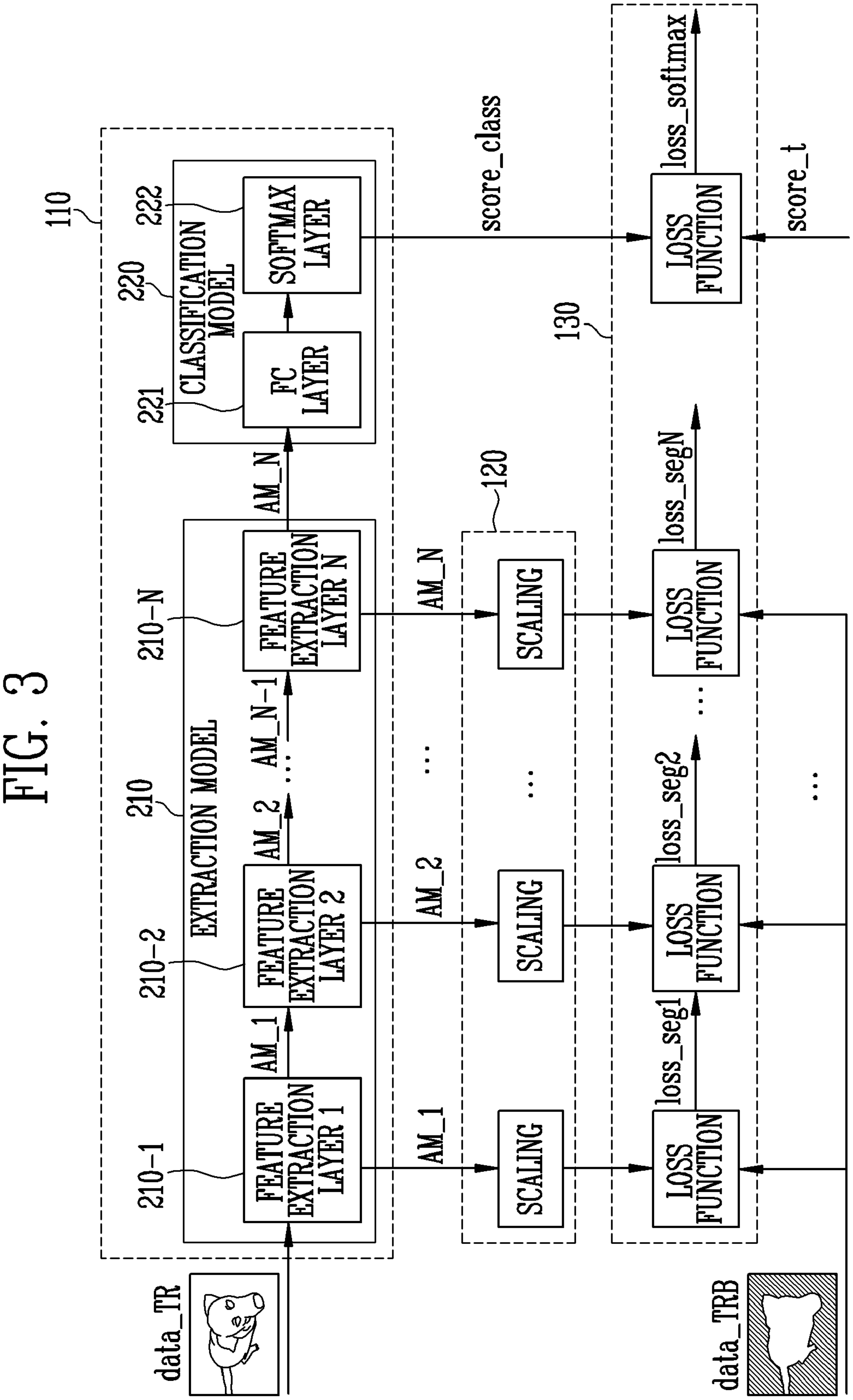
FIG. 3 is a diagram illustrating a method of training the classification network in accordance with an embodiment of the present disclosure.

FIG. 3 is a diagram illustrating a method of training the classification network in accordance with an embodiment of the present disclosure.

Referring to FIG. 3, the data trainer 100 in accordance with the embodiment of the present disclosure may include at least one of a data calculator 110, a scaler 120, and a loss value calculator 130. For some embodiments, the data calculator 110, the scaler 120, and the loss value calculator 130 may represent circuits.

The data calculator 110 may process data input to at least one of an extraction model 210 and a classification model 220. For example, it is assumed that the extraction model 210 includes first to Nth feature extraction layers 210-1 to 210-N.

The data calculator 110 may input a training image to the first feature extraction layer 210-1 arranged in a first order among the plurality of feature extraction layers 210-1 to 210-N. The data calculator 110 may acquire a first activation map AM_1 as output data of the first feature extraction layer 210-1 by processing the training image data_TR for each layer included in the first feature extraction layer 210-1. Also, the data calculator 110 may input the first activation map AM_1 to the second feature extraction layer 210-2 arranged in a second order among the plurality of feature extraction layers 210-1 to 210-N. The data calculator 110 may acquire a second activation map AM_2 as output data of the second feature extraction layer 210-2 by processing the first activation map AM_1 with respect to each layer included in the second feature extraction layer 210-2. By repeating the above-descried operation, the data calculator 110 may acquire an (N−1)th activation map as output data of the (N−1)th feature extraction layer arranged in an (N−1)th order among the plurality of feature extraction layers 210-1 to 210-N, and input the (N−1)th activation map to the Nth feature extraction layer 210-N. Also, the data calculator 110 may acquire an Nth activation map AM_N as output data of the Nth feature extraction layer 210-N by processing the (N−1)th activation map with respect to each layer included in the Nth feature extraction layer 210-N arranged in an Nth order as the last order among the plurality of feature extraction layers 210-1 to 210-N.

Also, the data calculator 110 may input the Nth activation map AM_N to the classification model 220. The classification model 220 may include a fully connected layer 221 and a softmax layer 222.

The fully connected layer 221 may be connected in series to the Nth feature extraction layer 210-N located in the last order among the plurality of feature extraction layers 210-1 to 210-N. The output data of the Nth feature extraction layer 210-N may be processed as input data of the fully connected layer 221. That is, the data calculator 110 may input the Nth activation map AM_N output from the Nth feature extraction layer 210-N to the fully connected layer 221.

The softmax layer 222 may be connected in series to the fully connected layer 221. That is, output data of the fully connected layer 221 may be processed as input data of the softmax layer 222.

The data calculator 110 may input each of the values output from the fully connected layer 221 to the softmax layer 222. The data calculator 110 may acquire, as a class score score_class, a set of scores calculated by applying a softmax function included in the softmax layer 222. The softmax function may be a function for converting an output value into a probability value through normalization.

The scaler 120 may adjust a size of each of the activation maps AM_1 to AM_N respectively output from the plurality of feature extraction layers 210-1 to 210-N. Also, the scaler 120 may acquire scaled activation maps obtained by adjusting the size of each of the activation maps AM_1 to AM_N. The adjusted size may be equal to a size of the training data data_TR. The size may represent a number of data or pixel values, arranged in horizontal and vertical directions (or row and column directions).

In an embodiment, the scaler 120 may acquire a first scaled activation map having a size equal to the size of the training image data_TR, based on the first activation map AM_1. The scaler 120 may acquire a second scaled activation map having a size equal to the size of the training image data_TR, based on the second activation map AM_2. By repeating the above-described operation, the scaler 120 may acquire an Nth scaled activation map having a size equal to the size of the training image data_TR, based on the Nth activation map AM_N. This is because the activation maps AM_1 to AM_N output according to a calculation result of convolution or the like, as compared with input data, have a form in which the sizes of the activation maps AM_1 to AM_N gradually decrease, and therefore, it may be necessary to adjust the size of each of the activation maps AM_1 to AM_N before the input data is input to a loss function.

The scaler 120 may adjust the size of each of the activation maps AM_1 to AM_N by using various algorithms including deconvolution, bicubic, Lanczos, Super Resolution CNN (SRCNN), Super Resolution Generative Adversarial Network (SRGAN), and the like.

The loss value calculator 130 may perform a calculation using a loss function. The loss function may be a function for obtaining an error between a target value and an estimated value. For example, the loss function may be one of various functions including an L1 loss function, an L2 loss function, a Structure Similar Index (SSIM), a VGG loss function, and the like.

In an embodiment, the loss value calculator 130 may acquire softmax loss value loss_softmax by inputting the class score score_class and a reference score score_t corresponding to an object to the loss function. The reference score score_t may be data representing a class or label of the object. For example, when the object corresponds to a second class among first to fourth classes, the reference score score_t may be [0, 1, 0, 0]T.

In an embodiment, the loss value calculator 130 may acquire a first segmentation value loss_seg1 by inputting the first scaled activation map and a binary image data_TRB to the loss function. The loss value calculator 130 may acquire a second segmentation value loss_seg2 by inputting the second scaled activation map and the binary image data_TRB to the loss function. By repeating the above-described operation, the loss value calculator 130 may acquire an Nth segmentation value loss_segN by inputting the Nth scaled activation map and the binary image data_TRB to the loss function.

In an embodiment, the loss value calculator 130 may acquire an activation map loss value, based on a plurality of segmentation values loss_seg1 to loss_segN. A specific example will be described. When assuming that the plurality of segmentation values loss_seg1 to loss_segN include a first segmentation value loss_seg1 and a second segmentation value loss_seg2, the loss value calculator 130 may acquire an activation map loss value, based on the first segmentation value loss_seg1 and the second segmentation value loss_seg2. The loss value calculator 130 may acquire, as the activation map loss value, a result value obtained by performing a calculation using the first segmentation value loss_seg1 and a second segmentation value loss_seg2. The calculation may be one of a sum calculation, a weight calculation, and an average calculation.

In an embodiment, the loss value calculator 130 may acquire, as a final loss value, a result value obtained by performing a weight calculation using the activation map loss value and the softmax loss value. The weight calculation may be a calculation of multiplying the activation map loss value and the softmax loss value respectively by different weighted values and then adding up the activation map loss value and the softmax loss. Each weighted value may be a predetermined value. In an embodiment, the sum of the different weighted values may be 1.

In an embodiment, the data calculator 110 may to train at least one of the plurality of feature extraction layers 210-1 to 210-N by back-propagating the final loss value to the classification network 200. In an embodiment, the final loss value may be input to an output terminal of the classification model 220. A calculation may be performed in a direction opposite to an input/output direction of data of the extraction model 210 and the classification model 220, which are described above.

In an embodiment, the data calculator 110 may repeatedly perform training such that the final loss value becomes low. In an embodiment, the data calculator 110 may repeatedly perform training until the final loss value becomes a threshold value or less. Accordingly, at least one of a plurality of weighted parameters included in a convolution layer included in each of the feature extraction layers 210-1 to 210-N may be updated in a direction in which the magnitude of the final loss value decreases.

In an embodiment, the training image data_TR may include pixel values of a first color channel, pixel values of a second color channel, and pixel values of a third color channel. For example, the training image data_TR may include pixel values of a red channel, pixel values of a green channel, and pixel values of a blue channel.

In an embodiment, the processor 1110 may further include a binary processor. The binary processor may generate a binary image data_TRB corresponding to the training image data_TR.

Specifically, the binary processor may acquire an average value of a pixel value of the first color channel, a pixel value of the second color channel, and a pixel value of the third color channel, which represent the same position, among the pixel values of the first color channel, the pixel values of the second color channel, and the pixel values of the third color channel, which are included in the training image data_TR.

When the average value is less than a threshold value, the binary processor may process the pixel value corresponding to the same position as a predetermined first value. Meanwhile, when the average value is equal to or greater than the threshold value, the binary processor may process the pixel value corresponding to the same position as a predetermined second value. For example, when the pixel value has a value of 8 bits such as 0 to 255, the threshold value may be set as 127, the first value may be set as 0, and the second value may be set as 255. However, this is merely an embodiment, and each of the threshold value, the first value, and the second value may be modified and embodied as various values.

A position (1, 1) will be described as an example. The binary processor may acquire an average value of a pixel value of the first color channel, which is located at (1, 1), a pixel value of the second color channel, which is located at (1, 1), and a pixel value of the third color channel, which is located at (1, 1). Also, when the average value with respect to (1, 1) is less than the threshold value, the binary processor may process, as the first value, the pixel value located at (1, 1) of the binary image data_TRB. Alternatively, when the average value with respect to (1, 1) is equal to or greater than the threshold value, the binary processor may process, as the second value, the pixel value located at (1, 1) of the binary image data_TRB. By repeating the above-described operation, the binary processor may acquire the binary image data_TRB including pixel values having the first value or the second value.

In an embodiment, each of the plurality of feature extraction layers 210-1 to 210-N may include a convolution layer. The convolution layer may include at least one filter. The filter may include a plurality of weighted parameters. At least one of the plurality of weighted parameters may be updated by training.

In an embodiment, each of the plurality of feature extraction layers 210-1 to 210-N may further include at least one of a pooling layer and an activation function layer.

The activation function layer may be connected in series to the convolution layer to process an output of the convolution layer as an input thereof. The activation function layer may perform a calculation using an activation function. Meanwhile, the pooling layer may receive, as an input, an activation map output from a feature extraction layer in a previous order. The pooling layer may perform a calculation for decreasing a number of values included in the activation map output from the feature extraction layer in the previous order. The pooling layer may be connected in series to the convolution layer to process an output of the pooling layer as an input of the convolution layer.

Hereinafter, for convenience of description, it is assumed and described that the plurality of feature extraction layers 210-1 to 210-N include a first feature extraction layer 210-1 and a second feature extraction layer 210-2, which are connected in series to each other.

Figure 4:
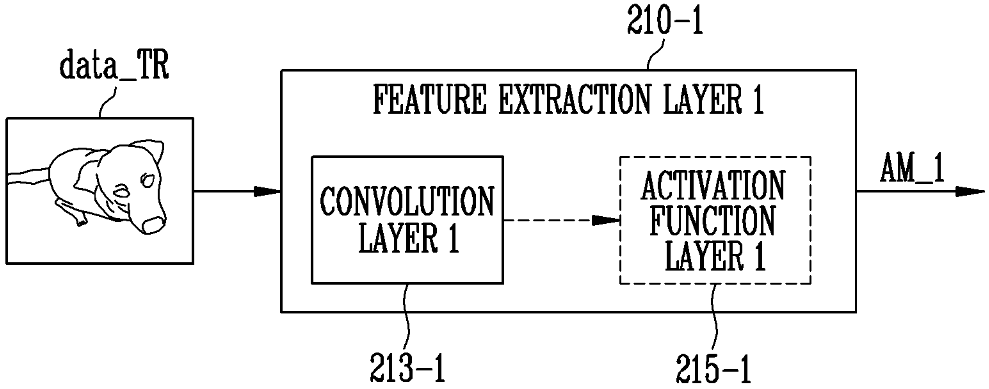
FIG. 4 is a diagram illustrating a first feature extraction layer in accordance with an embodiment of the present disclosure.

FIG. 4 is a diagram illustrating a first feature extraction layer in accordance with an embodiment of the present disclosure.

Referring to FIG. 4, the first feature extraction layer 210-1 may output a first activation map AM_1 with respect to a training image data_TR. That is, the first feature extraction layer 210-1 may output the first activation map AM_1 when the training image data_TR is input. For example, the data calculator 110 may input the training image data_TR or an input image to the first feature extraction layer 210-1, and acquire the first activation map AM_1 as output data of the first feature extraction layer 210-1.

In an embodiment, the first feature extraction layer 210-1 may include a first convolution layer 213-1. The first convolution layer 213-1 may include at least one filter. The first convolution layer 213-1 may perform a convolution calculation using the filter on input data. For example, when the training image data_TR is input, the first convolution layer 213-1 may perform a convolution calculation using the filter on the training image data_TR. The first convolution layer 213-1 may output, as output data, a result obtained by performing the convolution calculation. The filter may include weighted parameters arranged in row and column directions. For example, the filter may include weighted parameters arranged such as 2×2 or 3×3.

In an embodiment, the first feature extraction layer 210-1 may further include a first activation function layer 215-1. The first activation function layer 215-1 may be connected in series to the first convolution layer 213-1. The first activation function layer 215-1 may be connected to the first convolution layer 213-1 in a structure in which output data of the first convolution layer 213-1 is processed as input data of the first activation function layer 215-1.

Meanwhile, when the first activation function layer 215-1 is omitted, the first activation map AM_1 may be output data of the first convolution layer 213-1. Output data of each convolution layer is designated as a convolution map. That is, the first activation map AM_1 may be a first convolution map. Alternatively, when the first activation function layer 215-1 exists, the first activation map AM_1 may be output data of the first activation function layer 215-1.

FIGS. 5A to 5E are diagrams illustrating a convolution calculation in accordance with an embodiment of the present disclosure.

Referring to FIGS. 5A to 5E, a convolution layer in accordance with an embodiment of the present disclosure may include a filter 520. The filter 520 may include weighted parameters w1 to w4. When input data is input to the convolution layer, the data calculator 110 may acquire output data of the convolution layer by performing a convolution calculation using the filter 520 on the input data. In an embodiment, when an image 510 is input to the convolution layer, the data calculator 110 may perform a convolution calculation using the filter 520 on the image 510. The data calculator 110 may acquire a convolution map 550 as the output data of the convolution layer.

In an embodiment, the image 510 may include pixel values x1 to x9. Meanwhile, for convenience of description, the image 510 shown in FIGS. 5A to 5E represents only a portion of a training image data_TR or an input image. The image 510 may be an image of one channel.

Figure 5A:
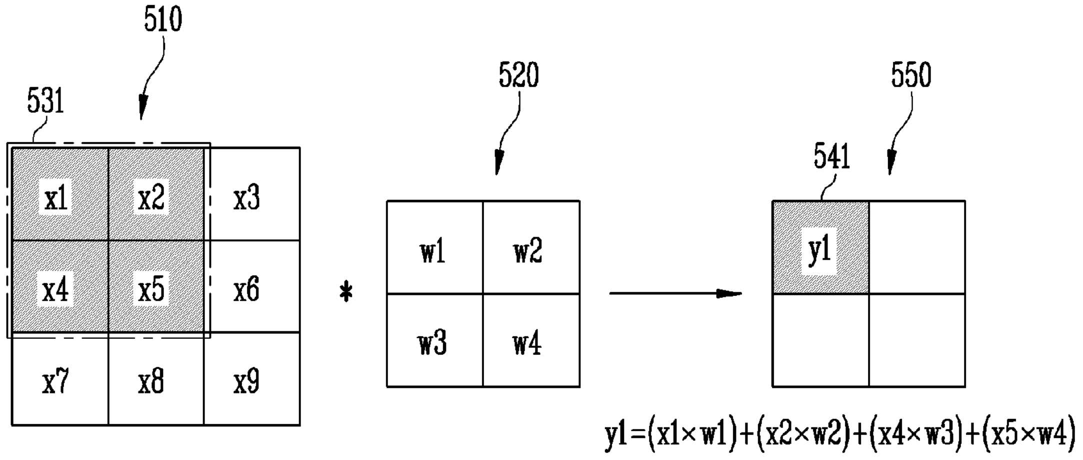
FIGS. 5A to 5E and 6A to 6B are diagrams illustrating a convolution calculation in accordance with an embodiment of the present disclosure.

Referring to FIG. 5A, the data calculator 110 may locate the filter 510 to overlap with a first area 531 of the image 510. The data calculator 110 may acquire, as a first convolution value 541 with respect to the first area 531, a value y1 obtained by adding up values respectively obtained by multiplying pixel values and weighted parameters, which correspond to the same positions, among pixel values x1, x2, x4, and x5 included in the first area 531 and the weighted parameters w1, w2, w3, and w4. For example, the data calculator 110 may obtain the result of calculating a first equation of FIG. 5A as the first convolution value 541. The first equation may be y1=(x1*w1)+(X2*w2)+(x4*w3)+(x5*w4).

Figure 5B:
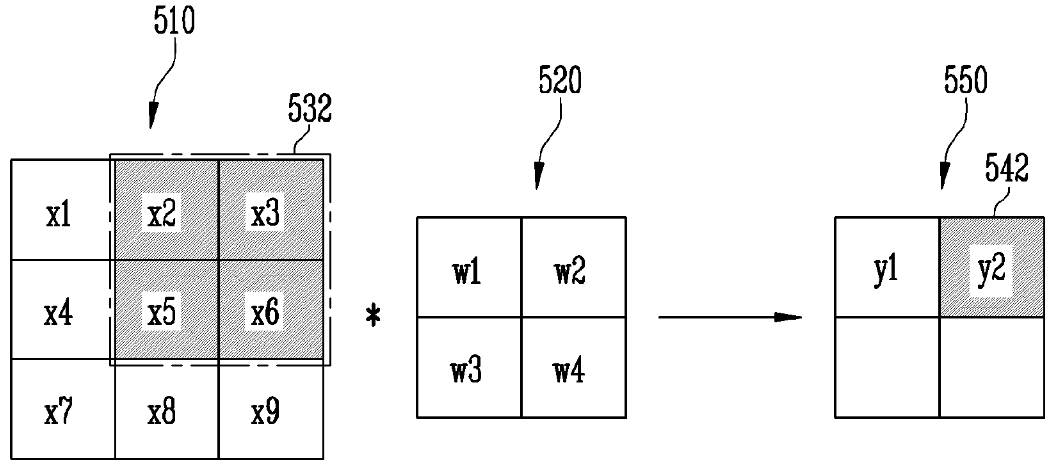

Referring to FIG. 5B, the data calculator 110 may move the filter 520 to a second area 532 of the image 510. The data calculator 110 may acquire, as a second convolution value 542 with respect to the second area 532, a value y2 obtained by adding up values respectively obtained by multiplying pixel values and weighted parameters, which correspond to the same positions, among pixel values x2, x3, x5, and x6 included in the second area 532 and the weighted parameters w1, w2, w3, and w4. For example, the data calculator 110 may obtain the result of calculating a second equation as the second convolution value 542. The second equation is based on the first equation of FIG. 5A, and may be y2=(x2*w1)+(X3*w2)+(x5*w3)+(x6*w4).

Figure 5C:
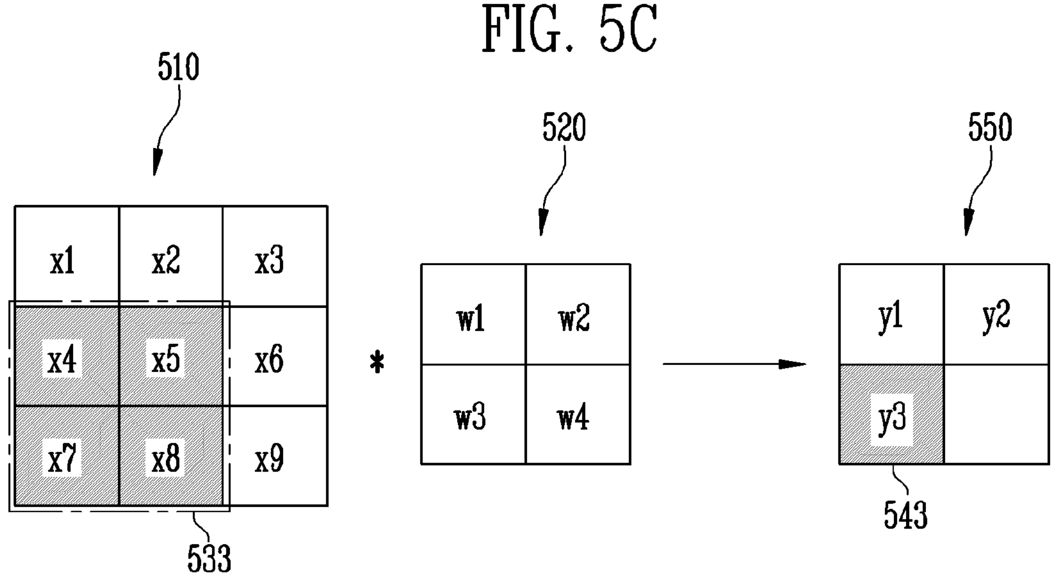

Referring to FIG. 5C, the data calculator 110 may move the filter 520 to a third area 533 of the image 510. The data calculator 110 may acquire, as a third convolution value 543 with respect to the third area 533, a value y3 obtained by adding up values respectively obtained by multiplying pixel values and weighted parameters, which correspond to the same positions, among pixel values x4, x5, x7, and x8 included in the third area 533 and the weighted parameters w1, w2, w3, and w4. For example, the data calculator 110 may obtain the result of calculating a third equation as the third convolution value 543. The third equation is based on the first equation of FIG. 5A, and may be y3=(x4*w1)+(X5*w2)+(x7*w3)+(x8*w4).

Figure 5D:
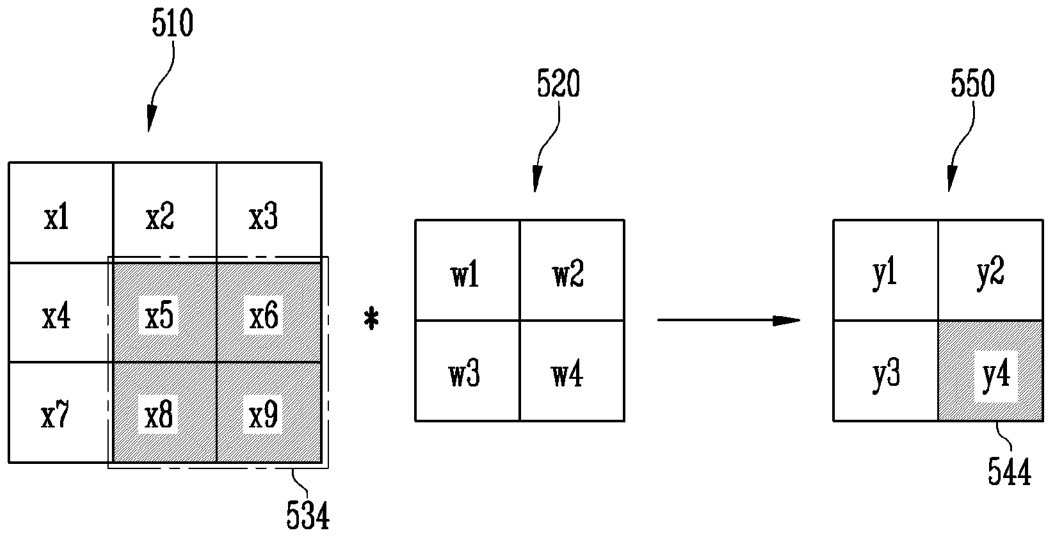

Referring to FIG. 5D, the data calculator 110 may move the filter 520 to a fourth area 534 of the image 510. The data calculator 110 may acquire, as a fourth convolution value 544 with respect to the fourth area 534, a value y4 obtained by adding up values respectively obtained by multiplying pixel values and weighted parameters, which correspond to the same positions, among pixel values x5, x6, x8, and x9 included in the fourth area 534 and the weighted parameters w1, w2, w3, and w4. For example, the data calculator 110 may obtain the result of calculating a fourth equation as the fourth convolution value 544. The fourth equation is based on the first equation of FIG. 5A, and may be y4=(x5*w1)+(X6*w2)+(x8*w3)+(x9*w4).

As described above, the data calculator 110 may acquire the convolution map 550 for the image 510 input to the convolution layer by using the filter 520 included in the convolution layer. That is, when the image 510 is input as input data of the convolution layer including the filter 520, the data calculator 110 may acquire the convolution map 550 as output data of the convolution layer. The convolution map 550 may include the first to fourth convolution values 541 to 544.

Meanwhile, although a case where the filter 520 is moved by one pixel value in a row or column direction has been described above, this is merely an embodiment, and the value by which the filter 520 is moved may be variously modified and embodied.

Meanwhile, when the convolution layer includes a plurality of filters 520, convolution maps 550 of which the number is equal to the number of the filters 520 may be output.

Figure 5E:
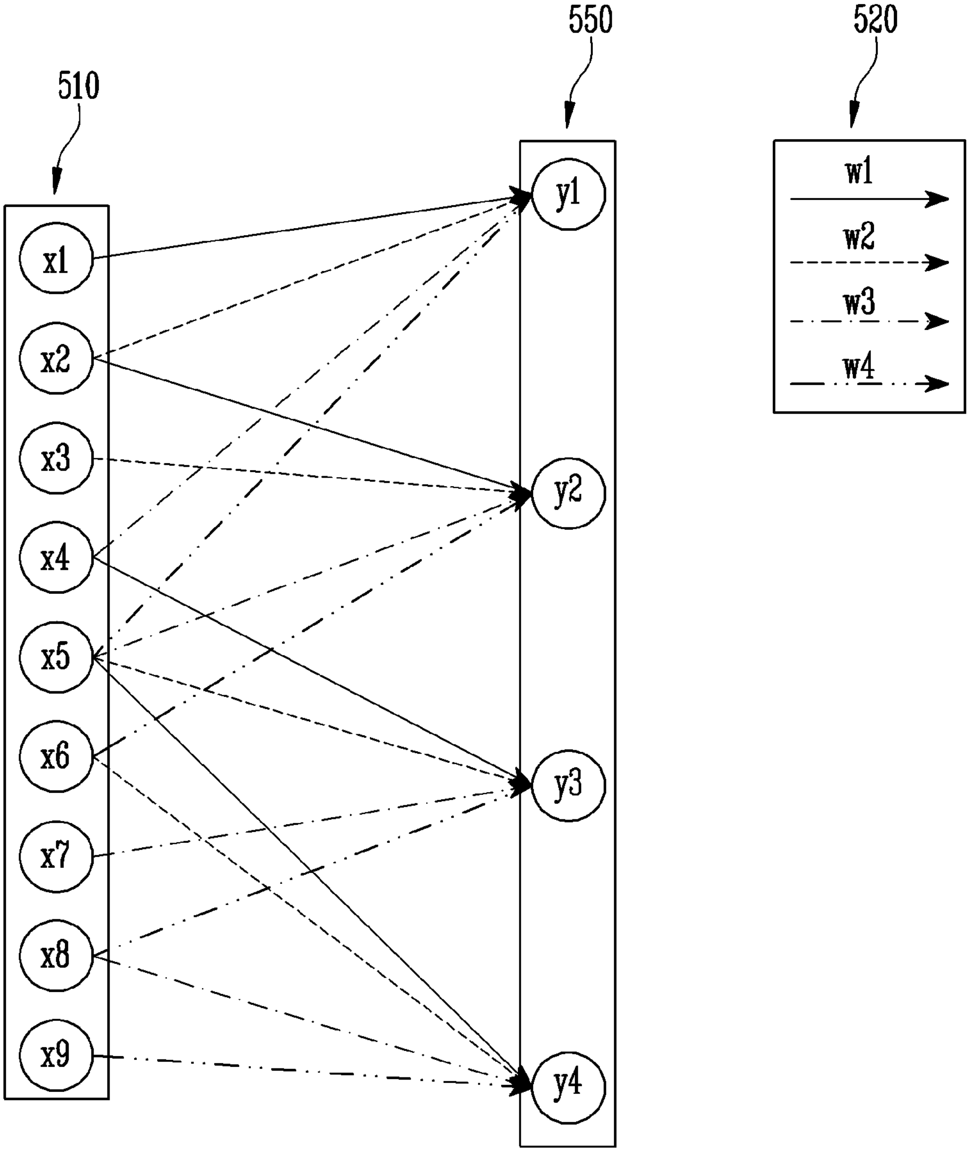

Meanwhile, the convolution calculation shown in FIGS. 5A to 5D may be represented as an artificial neural network structure shown in FIG. 5E. In an embodiment, referring to FIG. 5E, each output node may be connected to at least one input node. One of the values included in input data of the convolution layer may be input to each input node. For example, when the input data is the image 510, each of the pixel values x1 to x9 included in the image 510 may be input to the input node.

A convolution value y1, y2, y3, or y4 of each output node may be a value obtained by adding up values input to the output node. The values input to the output node may be values respectively obtained by multiplying values of input nodes by the weighted parameters w1 to w4. The convolution values y1 to y4 of the output nodes may be included in the output data of the convolution layer. For example, the convolution values y1 to y4 of the output nodes may be included in the convolution map 550.

Specifically, a convolution value y1, y2, y3, or y4 of each output node may be acquired through an input node connected to the corresponding output node and a convolution calculation using the weighted parameters w1 to w4 included in the filter 520. A first convolution value y1 of a first output node will be described as a representative example. As illustrated in FIG. 5A, the first convolution value y1 may be a value obtained by adding up a value obtained by multiplying a first pixel value x1 of a first input node connected to the first output node by a first weighted parameter w1, a value obtained by multiplying a second pixel value x2 of a second input node connected to the first output node by a second weighted parameter w2, a value obtained by multiplying a fourth pixel value x4 of a fourth input node connected to the first output node by a third weighted parameter w3, and a value obtained by multiplying a fifth pixel value x5 of a fifth input node connected to the first output node by a fourth weighted parameter w4.

Figure 6A:
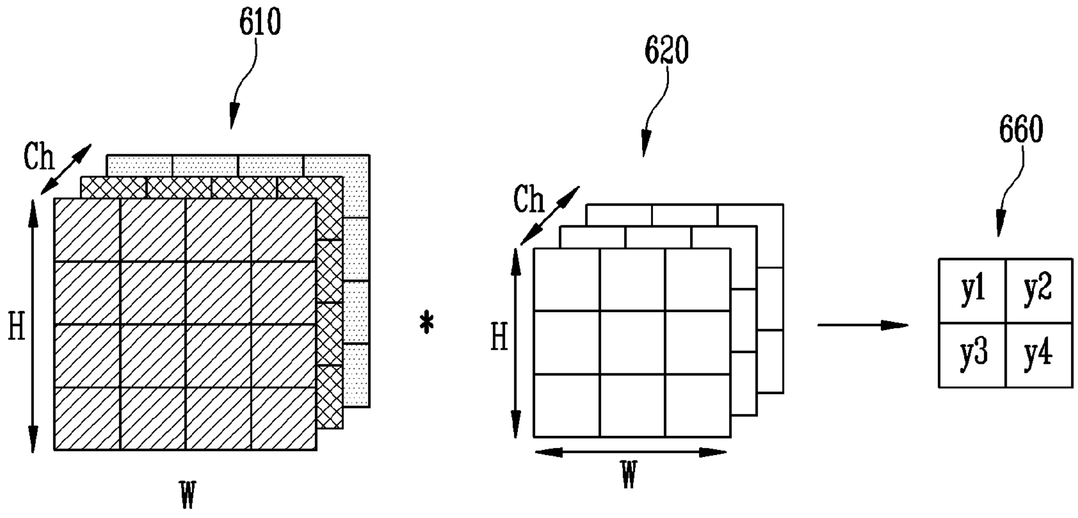
Figure 6B:
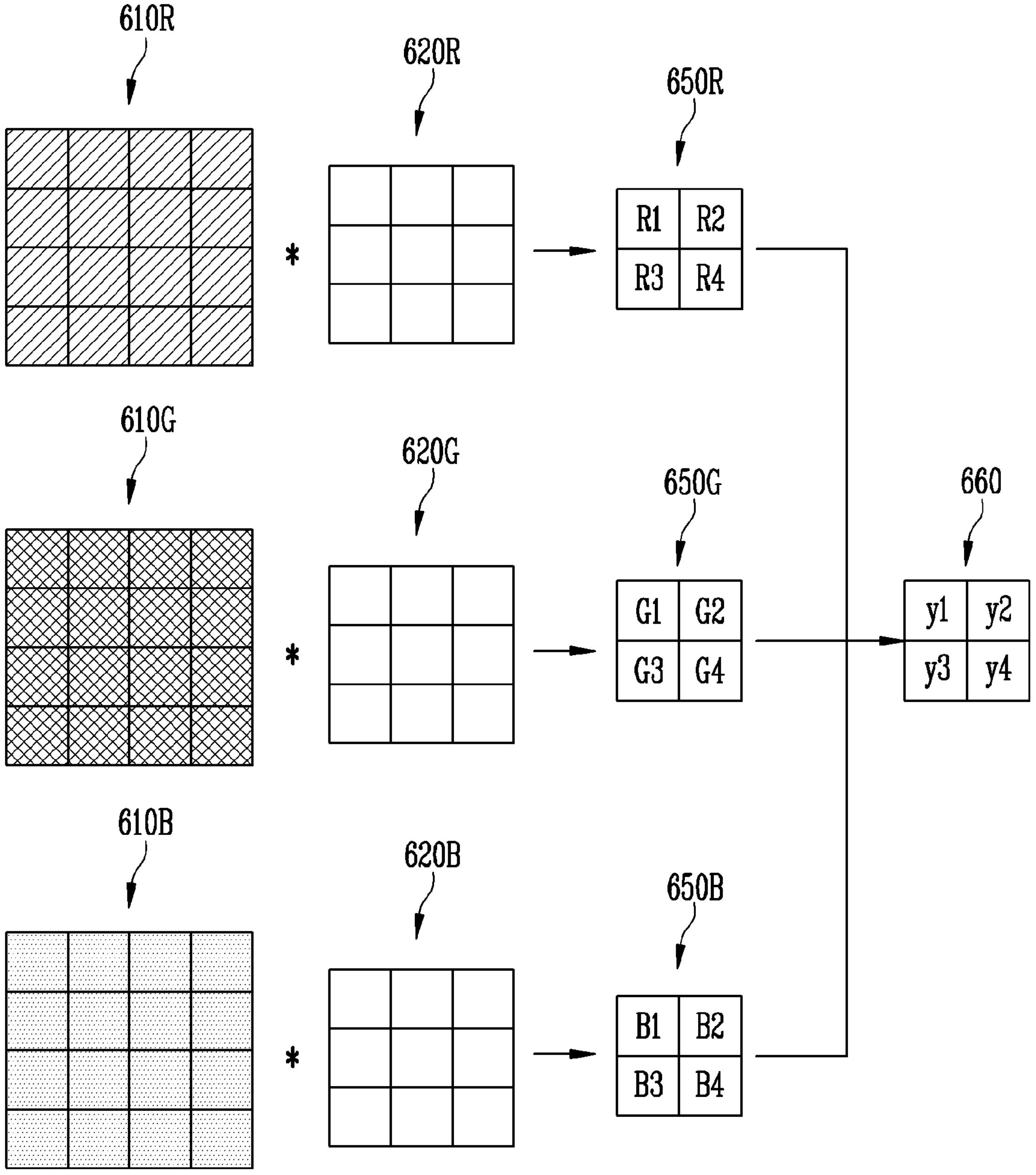

FIGS. 6A and 6B are diagrams illustrating a convolution calculation in accordance with an embodiment of the present disclosure.

Referring to FIGS. 6A and 6B, a multi-channel image 610 may be input to a convolution layer in accordance with an embodiment of the present disclosure. The convolution layer may include a multi-channel filter 620. The convolution layer may perform a convolution calculation by using an image and a filter of the same channel. The convolution layer may output a final convolution map 660 acquired as a result obtained by performing the convolution calculation.

A specific example will be described. The image 610 may include a first image 610R of a red channel, a second image 610G of a green channel, and a third image 610B of a blue channel. The first image 610R may include pixel values of the red channel. The second image 610G may include pixel values of the green channel. The third image 610B may include pixel values of the blue channel.

The filter 620 may include a first filter 620R of the red channel, a second filter 620G of the green channel, and a third filter 620B of the blue channel. Each of the first filter 620R, the second filter 620G, and the third filter 620B may include a plurality of weighted parameters independent from each other.

The convolution layer may acquire a first convolution map 650R by performing the convolution calculation on the first image 610R and the first filter 620R. The convolution layer may acquire a second convolution map 650G by performing the convolution calculation on the second image 610G and the second filter 620G. The convolution layer may acquire a third convolution map 650B by performing the convolution calculation on the third image 610B and the third filter 620B. Descriptions of the convolution calculation will be omitted here in that portions related to the convolution calculation are similar to those of the convolution calculation described above with reference to FIGS. 5A to 5E.

Also, the convolution layer may acquire the final convolution map 660 by adding up the first convolution map 650R, the second convolution map 650G, and the third convolution map 650B. For example, the convolution layer may obtain the final convolutional map 660 by summing the values of the first convolution map 650R, the second convolution map 650G, and the third convolution map 650B according to an equation. The equation may be yi=Ri+Gi+Bi for i=1 to 4.

Figures 7A, 7B:
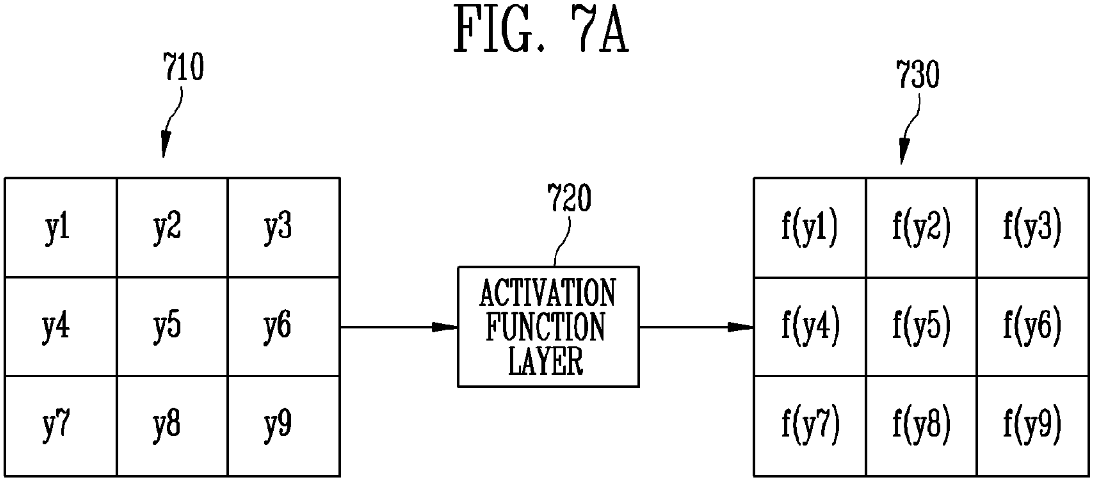
FIGS. 7A and 7B are diagrams illustrating an activation function layer in accordance with an embodiment of the present disclosure.

FIGS. 7A and 7B are diagrams illustrating an activation function layer in accordance with an embodiment of the present disclosure.

Referring to FIGS. 7A and 7B, the activation function layer 720 may output an activation map 730 when a convolution map is input. The activation map 730 may include values calculated by applying an activation function to each of values included in the convolution map 710. For example, the data calculator 110 may input the convolution map 710 to the activation function layer 720, and acquire the activation map 730 as output data of the activation function layer 720.

In accordance with an embodiment, the activation function may be a function for making an output value become nonlinear. In an embodiment, the activation function may be one of functions included in a function table 725 shown in FIG. 7B. For example, the activation function may be one of a Sigmoid function, a tanh function, a Rectified Linear Unit (ReLU) function, Leaky ReLU function, an Exponential Linear Unit (ELU) function, and maxout function.

Figure 8:
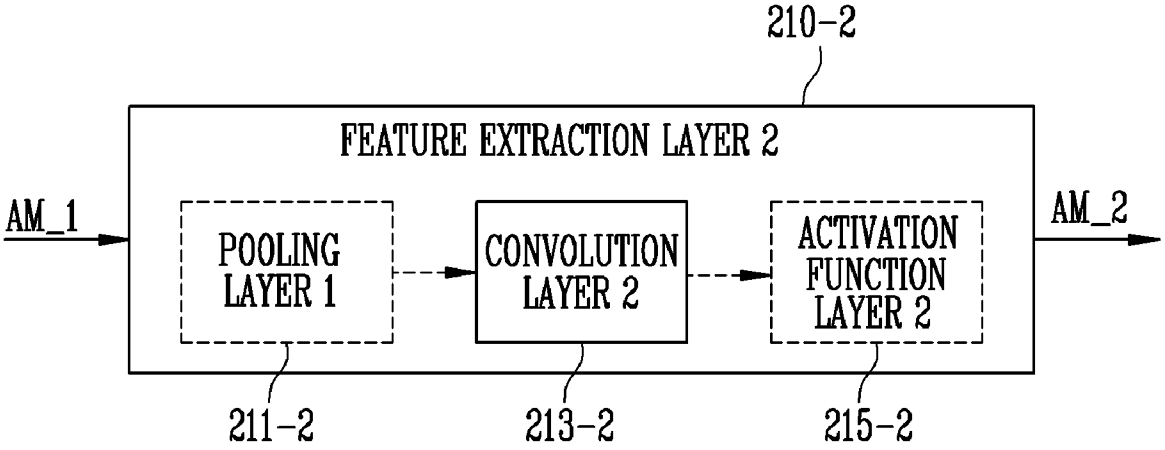
FIG. 8 is a diagram illustrating a second feature extraction layer in accordance with an embodiment of the present disclosure.

FIG. 8 is a diagram illustrating a second feature extraction layer in accordance with an embodiment of the present disclosure.

Referring to FIG. 8, the second feature extraction layer 210-2 may output a second activation map AM_2 with respect to a first activation map AM_1. That is, the second feature extraction layer 210-2 may output the second activation map AM_2 when the first activation map AM_1 is input. For example, the data calculator 110 may input the first activation map AM_1 to the second feature extraction layer 210-2, and acquire the second activation map AM_2 as output data of the second feature extraction layer 210-2.

The second feature extraction layer 210-2 may include a second convolution layer 213-2. The second convolution layer 213-2 may include at least one filter, which may include a plurality of weighted parameters. The second convolution layer 213-2 may perform a convolution calculation on input data by using the filter included in the second convolution layer 213-2. Descriptions of the convolution calculation will be omitted here in that portions related to the convolution calculation are similar to those of the convolution calculation described above with reference to FIGS. 5A to 6B.

The second feature extraction layer 210-2 in accordance with the embodiment of the present disclosure may further include at least one of a first pooling layer 211-2 and a second activation function layer 215-2.

The first pooling layer 211-2 may be connected in series to the second convolution layer 213-2. That is, the first pooling layer 211-2 and the second convolution layer 213-2 may be connected to each other such that output data of the first pooling layer 211-2 is processed as input data of the second convolution layer 213-2.

The first pooling layer 211-2 may perform a calculation for decreasing a number of values included in input data thereof. The input data of the first pooling layer 211-2 may be the first activation map AM_1. This will be described in detail with reference to FIGS. 9A and 9B.

The second activation function layer 215-2 may be connected in series to the second convolution layer 213-2. That is, the second activation function layer 215-2 and the second convolution layer 213-2 may be connected to each other such that output data of the second convolution layer 213-2 is processed as input data of the second activation function layer 215-2.

Figures 9A, 9B:
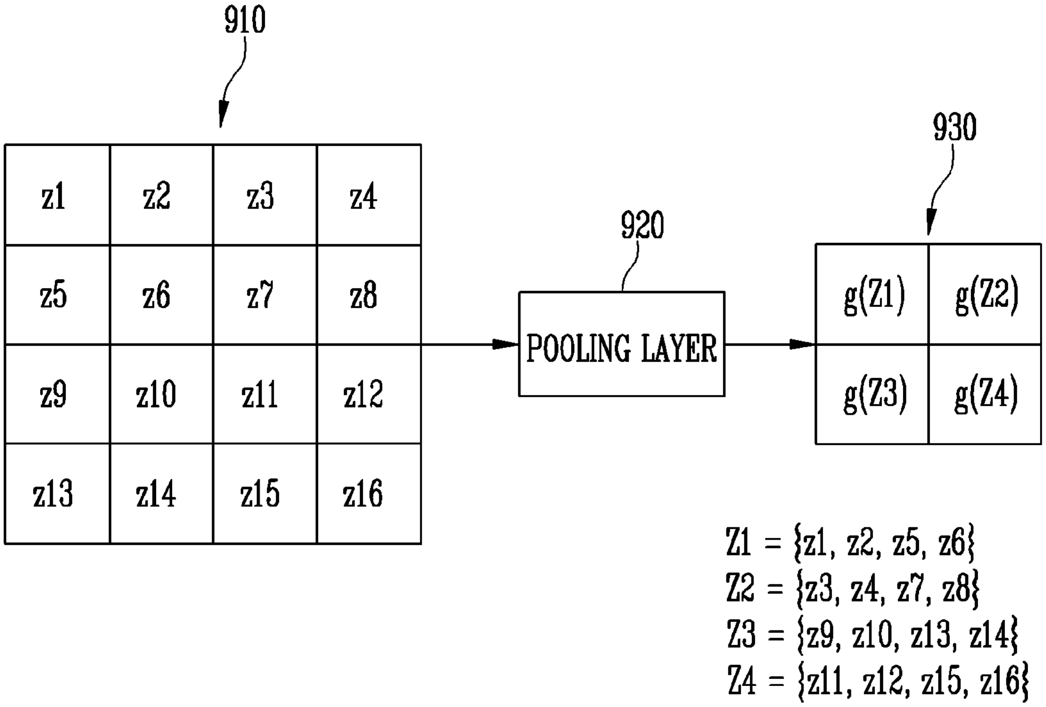
FIGS. 9A and 9B are diagrams illustrating a pooling layer in accordance with an embodiment of the present disclosure.

FIGS. 9A and 9B are diagrams illustrating a pooling layer in accordance with an embodiment of the present disclosure.

Referring to FIGS. 9A and 9B, the pooling layer 920 may output pooling data 930 when an activation map 910 is input. For example, the data calculator 110 may input the activation map 910 to the pooling layer 920, and acquire the pooling data 930 as output data of the pooling layer 920.

In an embodiment, when the activation map 910 is input, the pooling layer 920 may acquire the pooling data 930 by grouping values z1 to z16 included in the activation map 910 as groups for every unit area, and calculating a pooling function corresponding to each unit area. The pooling data 930 may include a first pooling value g(Z1) with respect to a first group Z1, a second pooling value g(Z2) with respect to a second group Z2, a third pooling value g(Z3) with respect to a third group Z3, and a fourth pooling value g(Z4) with respect to a fourth group Z4. Although it is assumed that the unit area has a size of 2×2, this may be variously modified and embodied.

The pooling function may be a function for decreasing a number of values included in the activation map 910. That is, the pooling function may be a function for decreasing a size of the activation map 910 through down-sampling. In an embodiment, the pooling function may be one of the functions included in a function table 925 shown in FIG. 9B. For example, the pooling function may be one of a max function, a min function, and an average function. Accordingly, a number of values included in the pooling data 930 may be smaller than the number of values included in the activation map 910.

Meanwhile, the pooling data 930 as the output data of the pooling layer 920 may be processed as input data of a convolution layer connected in series to the pooling layer 920.

Figure 10A:
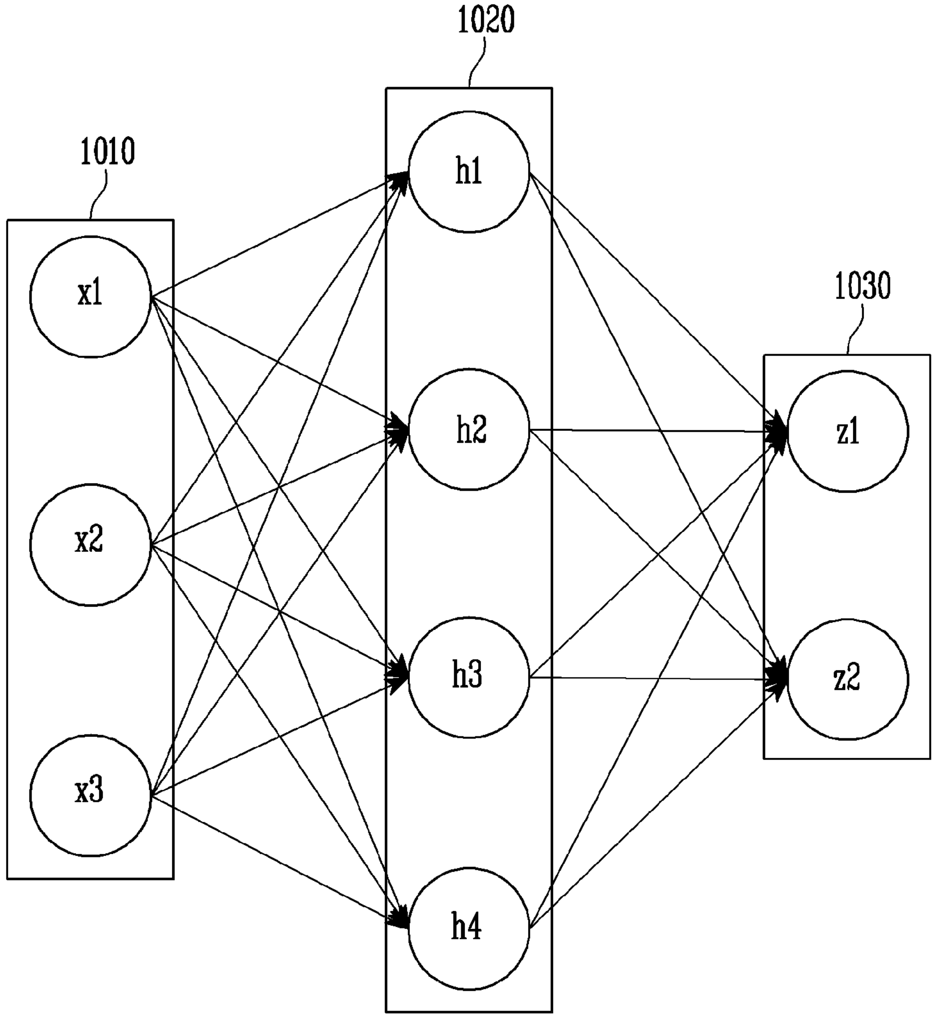
FIG. 10A is a diagram illustrating a fully connected layer in accordance with an embodiment of the present disclosure.

FIG. 10A is a diagram illustrating a fully connected layer in accordance with an embodiment of the present disclosure.

Referring to FIG. 10A, the fully connected layer 221 may include an input layer 1010, a hidden layer 1020, and an output layer 1030, which are connected in series to each other.

The data calculator 110 may encode data input to the input layer 1010 as one-dimensional data. The input data may be three-dimensional data such as width×length×channel. The input layer 1010 may include a plurality of input nodes. One of one-dimensional data values x1 to x3 may be input to one input node.

The hidden layer 1020 may include a plurality of hidden nodes. The hidden layer 1020 may have a structure in which each of the plurality of hidden nodes is connected to the plurality of input nodes. A weighted parameter may be set between input and output nodes connected to each other. Also, the weighted parameter may be updated through training. The data calculator 110 may perform a weight calculation on input values x1 to x3 corresponding to input nodes connected to one hidden node, and acquire each hidden value h1, h2, h3, or h4 corresponding to the one hidden node as a result obtained by performing the weight calculation.

In accordance with an embodiment, the hidden layer 1020 may be omitted. In accordance with another embodiment, the hidden layer 1020 may be configured with a plurality of layers.

The output layer 1030 may include a plurality of output nodes. The output layer 1030 may have a structure in which each of the plurality of output nodes is connected to the plurality of hidden nodes. A weighted parameter may be set between hidden and output nodes connected to each other. The weighted parameter may be updated through training. The data calculator 110 may perform a weight calculation on hidden values h1 to h4 corresponding to hidden nodes connected to one output node, and acquire each output value z1 or z2 corresponding to the one output node as a result obtained by performing the weight calculation. A number of the output values z1 and z2 may be equal to a number of the output nodes.

Figure 10B:
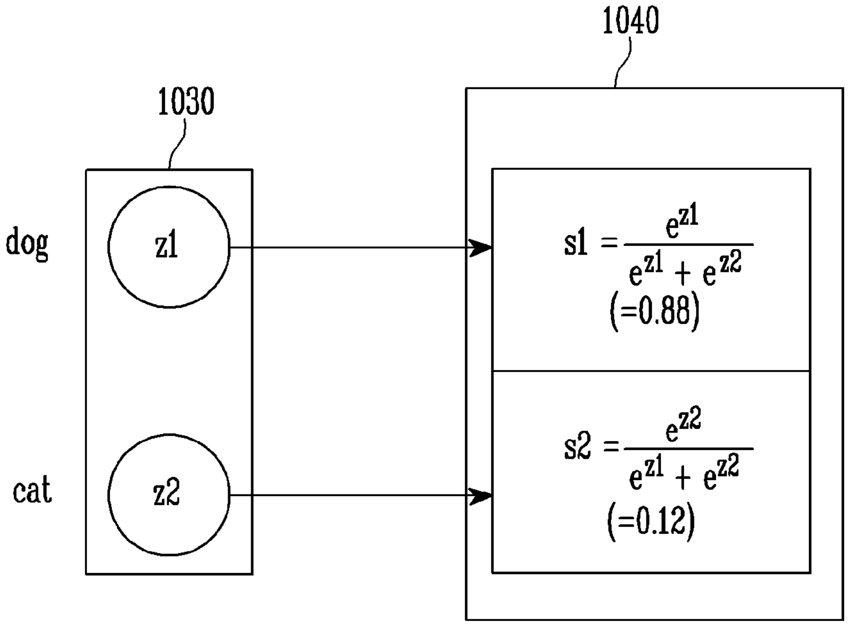
FIG. 10B is a diagram illustrating a softmax layer in accordance with an embodiment of the present disclosure.

FIG. 10B is a diagram illustrating a softmax layer in accordance with an embodiment of the present disclosure.

Referring to FIG. 10B, the softmax layer 1040 may perform a calculation using a softmax function on each of output values z1 and z2 of the output layer 1030. For example, the data calculator 110 may input output values z1 and z2 of the fully connected layer 221 to the softmax layer 1040, and acquire a class score score_class as output data of the softmax layer 1040. The class score score_class may include a plurality of scores s1 and s2.

The softmax function may be a function for converting the output values z1 and z2 into the scores s1 and s2 representing probabilities. The softmax function in accordance with the embodiment of the present disclosure may be a function such as Softmax(zk) shown in FIG. 10B.

Each of the scores z1 and z2 may correspond to one class. For example, a first score S1 may represent a degree to which an object included in an image is matched to a first class. A second score s2 may represent a degree to which the object included in the image is matched to a second class. That a value of the first score s1 is higher than a value of the second score s2 may mean that the probability that the object included in the image will be classified as the first class is high.

Figure 10C:
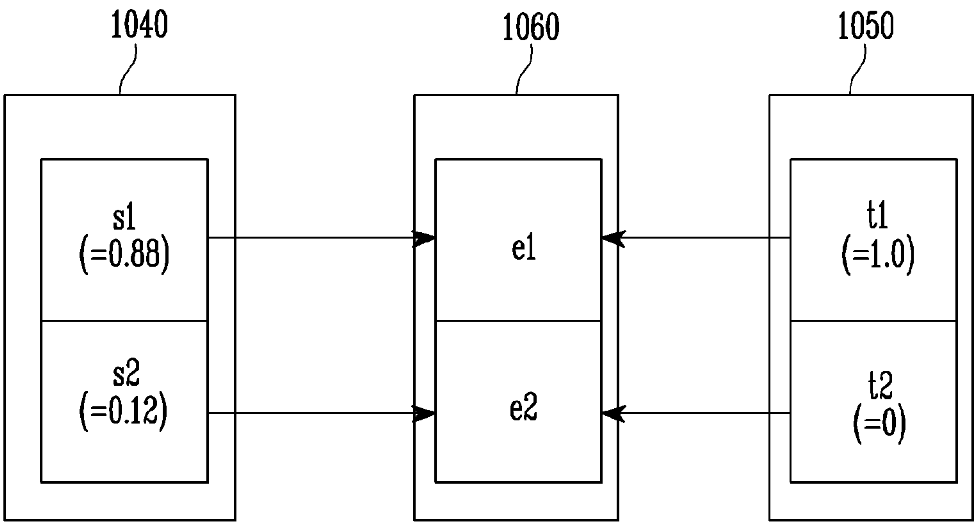
FIG. 10C is a diagram illustrating a softmax loss value in accordance with an embodiment of the present disclosure.

FIG. 10C is a diagram illustrating a softmax loss value in accordance with an embodiment of the present disclosure.

Referring to FIG. 10C, the loss value calculator 130 may input the class score s1 and s2 output from the softmax layer 1040 and a reference score 1050 to a loss function, and acquire a softmax loss value loss-softmax as a result obtained by calculating the loss function.

In accordance with an embodiment, the loss value calculator 130 may acquire, as a first error e1, a difference between the first score s1 corresponding to the first class among the scores s1 and s2 included in the class score s1 and s2 and a first reference value t1 corresponding to the first class among reference values t1 and t2 included in the reference score 1050. Also, the loss value calculator 130 may acquire, as a second error e2, a difference between the second score s2 and a second reference value t2, which correspond to the second class. In an embodiment, the loss value calculator 130 may acquire, as the softmax loss value loss_softmax, a value obtained by adding up the first error e1 and the second error e2. In an embodiment, the loss value calculator 130 may acquire, as the softmax loss value loss_softmax, a value obtained by adding up a square value of the first error e1 and a square value of the second error e2.

However, this is merely an embodiment, and the loss value calculator 130 may acquire the softmax loss value loss-softmax by using one of various loss functions including an L1 loss function, an L2 loss function, a Structure Similar Index (SSIM), a VGG loss function, and the like.

Figures 11A, 11B:
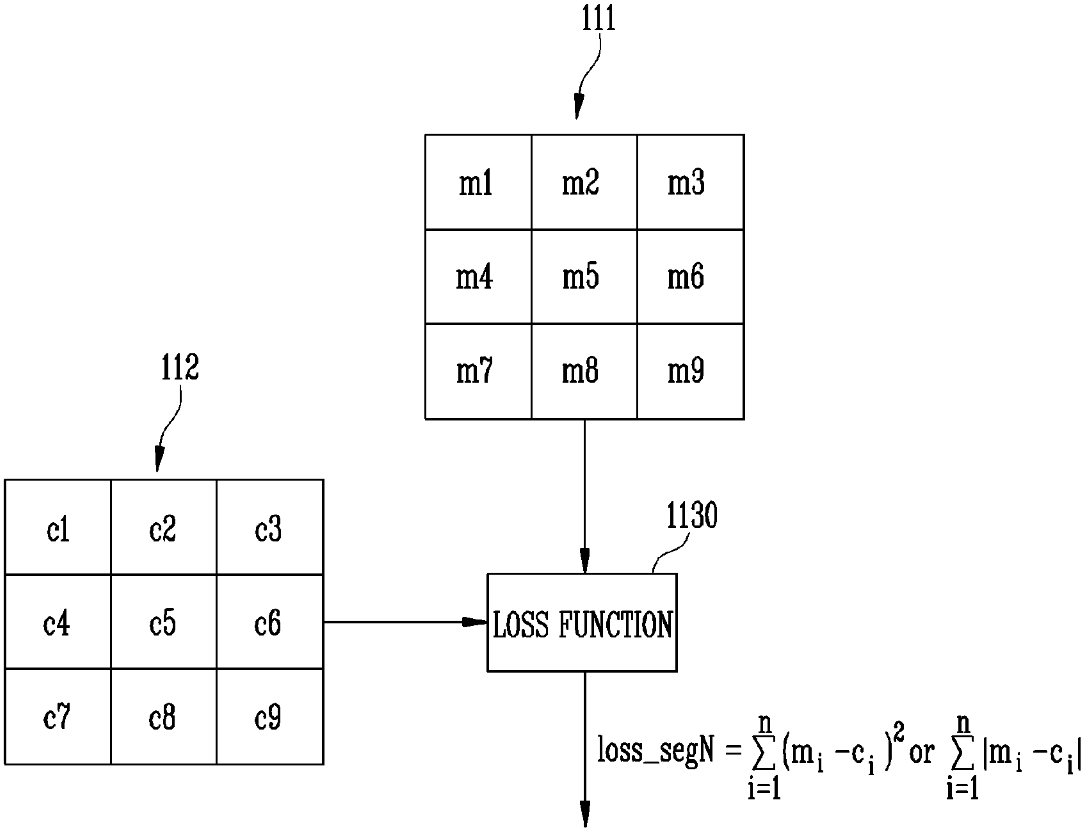
FIG. 11A is a diagram illustrating a segmentation value in accordance with an embodiment of the present disclosure.
FIG. 11B is a diagram illustrating a final loss value in accordance with an embodiment of the present disclosure.

FIG. 11A is a diagram illustrating a segmentation value in accordance with an embodiment of the present disclosure.

Referring to FIG. 11A, the loss value calculator 130 may input an Nth scaled activation map 111 and a binary image 112 to a loss function 1130, and acquire an Nth segmentation value loss_segN as a result obtained by calculating a first loss function. The Nth scaled activation map 111 may include a plurality of values m1 to m9. The binary image 112 may include a plurality of values c1 to c9. For example, the Nth scaled activation map 111 and the binary image 112 may include the same number of values. The Nth segmentation value loss_segN may be one value.

In accordance with an embodiment, the loss value calculator 130 may select a first value m1 at a position (1, 1) among the values m1 to m9 included in the Nth scaled activation map 111, and select a first value c1 at the position (1, 1) among the values c1 to c9 included in the binary image 112. The loss value calculator 130 may acquire, as first error, a difference between the first values m1 and c1 at the same position (1, 1). Also, the loss value calculator 130 may select second values m2 and c2 at a position (2, 1), and acquire, as a second error, a difference between the second values m2 and c2 at the same position (2, 1). In this manner, the loss value calculator 130 may acquire, as a ninth error, a difference between ninth values m9 and m9 at a position (3, 3). In an embodiment, the loss value calculator 130 may acquire, as the Nth segmentation value loss_segN, a value obtained by adding up square values of the first to ninth errors.

However, this is merely an embodiment, and the loss value calculator 130 may acquire the Nth segmentation value loss_segN by using one of various loss functions including an L1 loss function, an L2 loss function, a Structure Similar Index (SSIM), a VGG loss function, and the like. Through the manner described above, the loss value calculator 130 may acquire first to Nth segmentation values loss_seg1 to loss_segN.

FIG. 11B is a diagram illustrating a final loss value in accordance with an embodiment of the present disclosure.

Referring to an equation shown in (1) of FIG. 11B, in an embodiment, the loss value calculator 130 may acquire, as an activation map loss value loss_AM, a result value obtained by performing a sum calculation using a plurality of segmentation values loss_seg1 to loss_segN. However, this is merely an embodiment, and the sum calculation may be changed to one of a weight calculation and an average calculation to be performed.

Referring to an equation shown in (2) of FIG. 11B, in an embodiment, the loss value calculator 130 may acquire, as a final loss value loss_f, a result value obtained by performing a weight calculation using an activation map loss value loss_AM and a softmax loss value loss_softmax. The weight calculation may be a calculation of multiplying the activation map loss value loss_AM and the softmax loss value loss_softmax respectively by different weighted values $\alpha$ and $1-\alpha$, and adding up the activation map loss value loss_AM and the softmax loss value loss_softmax. Each of the weighted values $\alpha$ and $1-\alpha$ may be a predetermined value. In an embodiment, the sum of the different weighted values $\alpha$ and $1-\alpha$ may be 1.

Figure 11C:
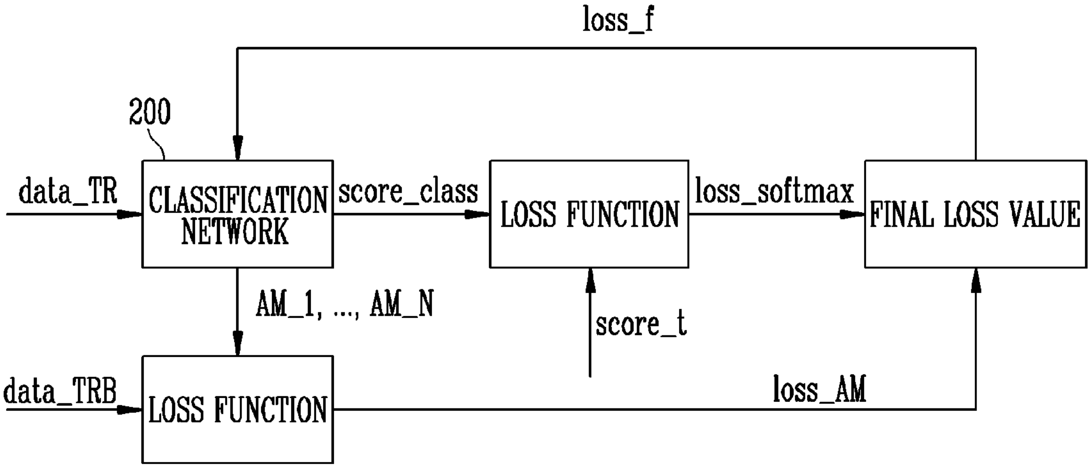
FIG. 11C is a diagram illustrating training of the classification network in accordance with an embodiment of the present disclosure.

FIG. 11C is a diagram illustrating training of the classification network in accordance with an embodiment of the present disclosure.

Referring to FIG. 11C, the data trainer 100 may input a training image data_TR to the classification network 200.

The data trainer 100 may acquire a class score score_class output from the classification network 200. The data trainer 100 may acquire a softmax loss value loss_softmax output from a loss function using the class score score_class and a reference score score_t.

Meanwhile, the data trainer 100 may acquire scaled activation maps by scaling activation maps AM_1 to AM_N respectively output from a plurality of feature extraction layers 210-1 to 210-N included in the classification network 200. The data trainer 100 may acquire an activation map loss value loss_AM by calculating a binary image data_TRB corresponding to the training image data_TR and a loss function using each of the scaled activation maps.

The data trainer 100 may acquire a final loss value loss_f through a weight calculation on the softmax loss value loss_softmax and the activation map loss value loss_AM. The data trainer 100 may train at least one of the plurality feature extraction layers 210-1 to 210-N by back-propagating the final loss value loss_f to the classification network 200. In an embodiment, the final loss value loss_f may be input to an output node of the classification network 200 or the classification model 220, to be calculated in a reverse order by considering edges connected to each node. Accordingly, at least one of weighted parameters of a convolution layer included in each of the plurality of feature extraction layers 210-1 to 210-N may be updated.

Figure 12A:
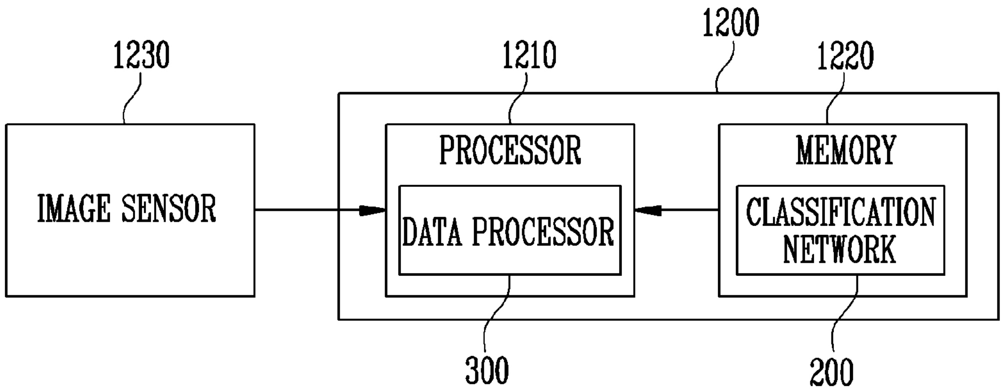
FIGS. 12A and 12B are diagrams illustrating an electronic apparatus using a trained classification network in accordance with an embodiment of the present disclosure.
Figure 12B:
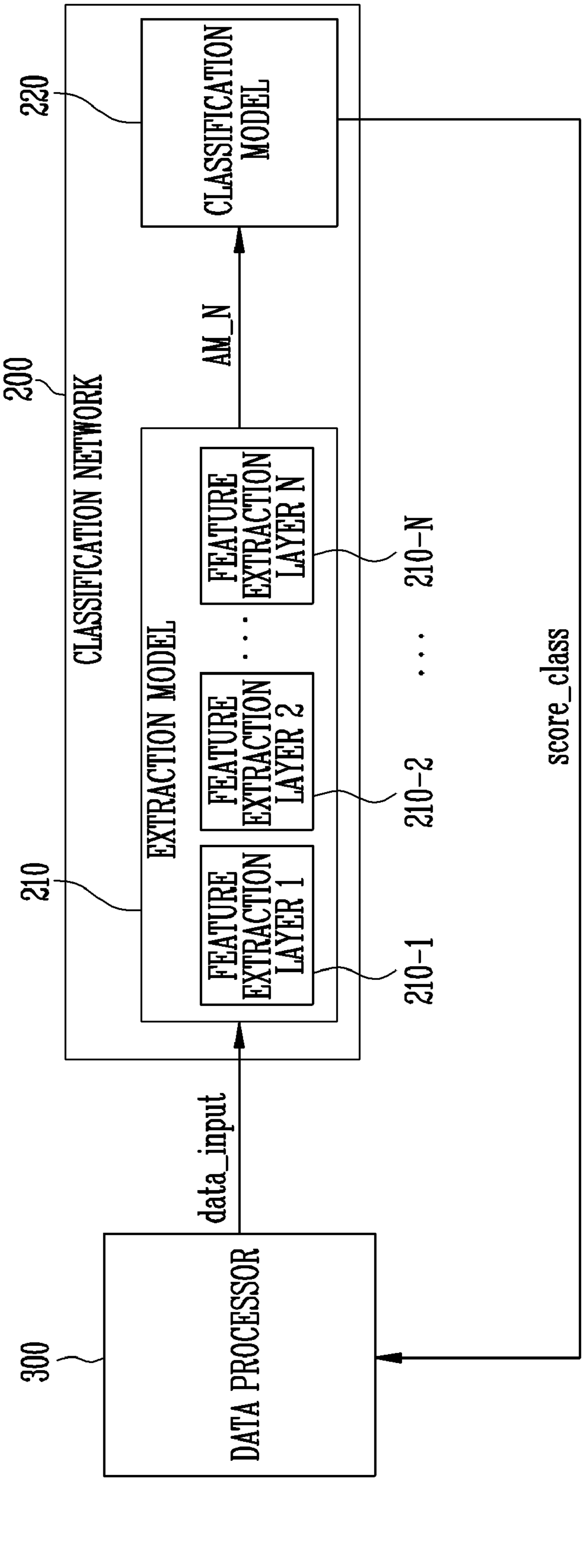

FIGS. 12A and 12B are diagrams illustrating an electronic apparatus using a trained classification network in accordance with an embodiment of the present disclosure.

Referring to FIGS. 12A and 12B, a third electronic apparatus 1200 in accordance with the embodiment of the present disclosure may include a processor 1210 and a memory 1220.

The processor 1210 may be implemented as a general purpose process such as a Central Processing Unit (CPU) or an Application Processor Unit (APU), a graphic dedicated processor such as a Graphic Processing Unit (GPU), an artificial intelligence dedicated processor such as a Neural Processing Unit (NPU), or the like. The processor 1210 may be configured with one or a plurality of processor units.

The memory 1220 may store various information such as data, information or instructions in an electrical or magnetic form. To this end, the memory 1220 may be implemented as at least one among nonvolatile memory, volatile memory, flash memory, a hard disk drive (HDD) or solid state drive (SSD), RAM, ROM, and the like.

The memory 1220 may store a trained classification network 200. The trained classification network 200 may be one trained to classify an object included in an image. Specifically, the trained classification network 200 may be a neural network trained based on a weight calculation of a softmax loss value loss_softmax acquired using a class score score_class corresponding to a training image data_TR input to the classification network 200, and an activation map loss value loss_AM acquired using activation maps output from each of a plurality of feature extraction layers included in the classification network 200.

The classification network 200 may include an extraction model 210 and a classification model 220. The extraction model 210 may include a plurality of feature extraction layers 210-1 to 210-N. The classification model 220 may include a fully connected layer 221 and a softmax layer 222. The fully connected layer 221 may be one connected in series to a feature extraction layer in a last order among the plurality of feature extraction layers. The softmax layer 222 may be one connected in series to the fully connected layer 221.

In an embodiment, each of the plurality of feature extraction layers 210-1 to 210-N may include a convolution layer and an activation function layer, which are connected in series. The convolution layer may include a plurality of weighted parameters. At least one of the plurality of weighted parameters may be one updated by back-propagating a loss value acquired as a result of the weight calculation to the classification network 200.

In an embodiment, the activation map loss value loss_AM may be a sum of segmentation values acquired by applying a loss function to each of activation maps of which size is adjusted to be equal to a size of the training image data_TR and a binary image data_TRB corresponding to the training image data_TR.

In an embodiment, each of input data data_input and the training image data_TR may include pixel values of a first color channel, pixel values of a second color channel, and pixel values of a third color channel.

The processor 1210 in accordance with the embodiment of the present disclosure may include a data processor 300. The data processor 300 may input the received input image data_input to the classification network 200. The data processor 300 may acquire a class score score_class representing a score with which an object included in the input image data_input is matched to each of a plurality of classes through the classification network 200.

In an embodiment, the data processor 300 may input the input image data_input to a first feature extraction layer 210-1 among the plurality of feature extraction layers 210-1 to 210-N included in the classification network 200. The data processor 300 may input a first activation map output from the first feature extraction layer 210-1 to a second feature extraction layer 210-2. In this manner, the data processor 300 may input an (N−1)th activation map output from an (N−1)th feature extraction layer to an Nth feature extraction layer 210-N. Also, the data processor 300 may input an Nth activation map AM_N output from the Nth feature extraction layer 210-N to the classification model 220. The data processor 300 may acquire a class score score_class output from the classification model 220. The data processor 300 may classify the object as a class corresponding to a highest score among a plurality of scores included in the class score score_class.

Meanwhile, the input image data_input may be received through an image sensor 1230. The image sensor 1230 may be included in the third electronic apparatus 1200, or separately exist at the outside of the third electronic apparatus 1200.

The image sensor 1230 may acquire an image by sensing an optical signal. To this end, the image sensor 1230 may be implemented as a Charge Coupled Device (CCD) sensor, a Complementary Metal Oxide Semiconductor (CMOS) sensor, or the like.

Figure 13A:
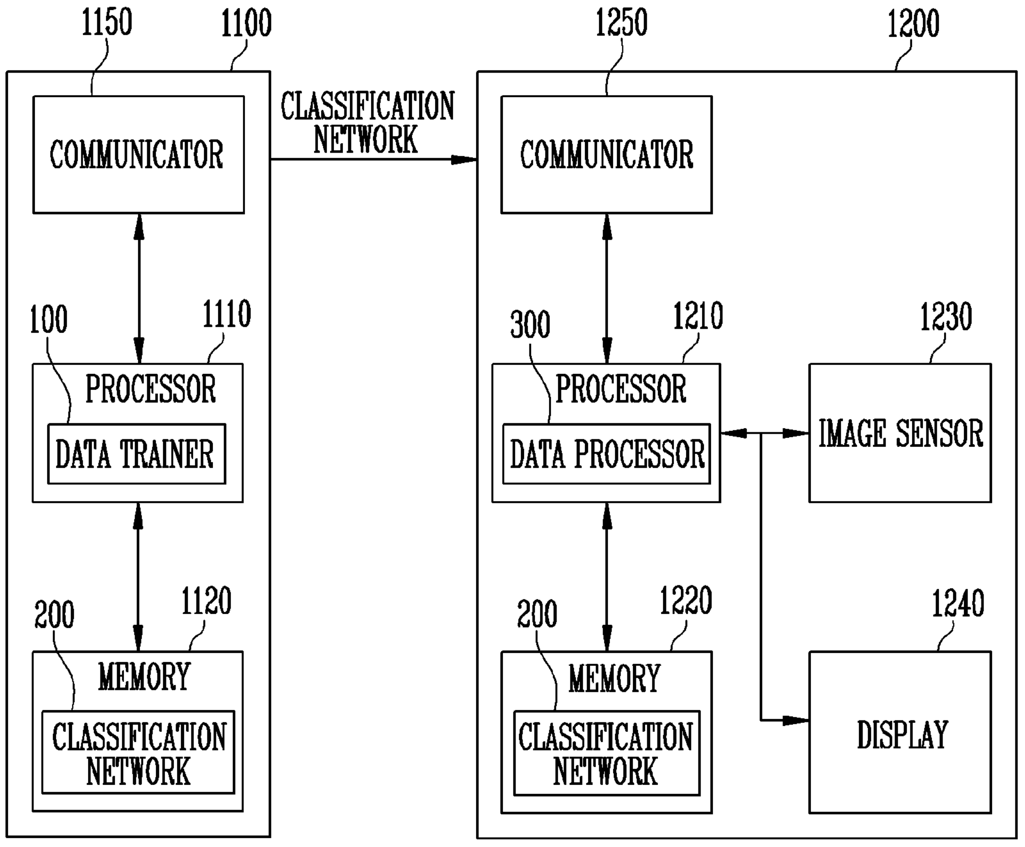
FIGS. 13A and 13B are diagrams illustrating a method using a trained classification network in accordance with an embodiment of the present disclosure.
Figure 13B:
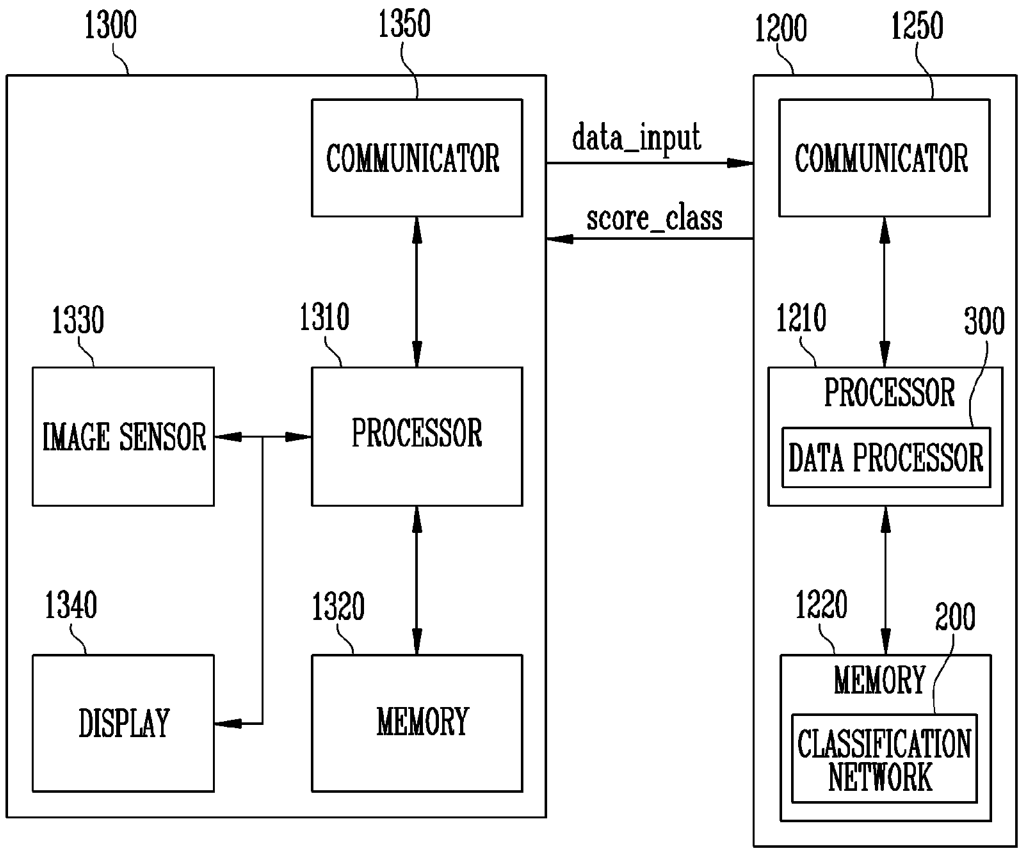

FIGS. 13A and 13B are diagrams illustrating a method using a trained classification network in accordance with an embodiment of the present disclosure.

Referring to FIG. 13A, in an embodiment, the third electronic apparatus 1200 may further include an image sensor 1230 and a display 1240.

The image sensor 1230 may acquire an input image data_input including an object by photographing the object.

The display 1240 may display information. To this end, the display 1240 may be implemented as various types of displays such as a Liquid Crystal Display (LCD) which uses a separate backlight unit (e.g., a light emitting diode (LED) or the like) as a light source and controls a molecular arrangement of liquid crystals, thereby adjusting a degree to which light emitted from the backlight unit is transmitted through the liquid crystals (e.g., brightness of light or intensity of light) and a display using, as a light source, a self-luminous element (e.g., a mini LED of which size is 100 μm to 200 μm, a micro LED of which size is 100 μm or less, an Organic LED (OLED), a Quantum dot LED (QLED), or the like) without any separate backlight unit or any liquid crystals. The display 1240 may emit, to the outside, lights of red, green, and blue, corresponding to an output image.

When the input image data_input is received through the image sensor 1230, the processor 1210 may input the input image data_input to the classification network 200. In an embodiment, the processor 1210 may include a data processor 300. The data processor 300 may input the received input image data_input to the classification network 200. The data processor 300 may acquire a class score score_class representing a score with which an object included in the input image data_input is matched to each of a plurality of classes through the classification network 200. Also, the processor 1210 may control the display 1240 to display a result obtained by classifying an object as a class corresponding to a highest score among scores included in a class score score_class output from the classification network 200.

In accordance with an embodiment, the third electronic apparatus 1200 may further include a communicator 1250. The communicator 1250 may perform data communication with the second electronic apparatus 1100 according to various schemes. To this end, the second electronic apparatus 1100 may include a communicator 1150.

The communicator 1150 or 1250 may communicate various information by using a communication protocol such as a Transmission Control Protocol/Internet Protocol (TCP/IP), a User Datagram Protocol (UDP), a Hyper Text Transfer Protocol (HTTP), a Secure Hyper Text Transfer Protocol (HTTPS), a File Transfer Protocol (FTP), a Secure File Transfer Protocol (SFTP), or a Message Queuing Telemetry Transport (MQTT).

To this end, the communicator 1150 or 1250 may be connected to a network through wired communication or wireless communication. The network may be a Personal Area Network (PAN), a Local Area Network (LAN), a Wide Area Network (WAN), or the like according to an area or scale, and may be Intranet, Extranet, Internet, or the like according to openness of the network.

The wireless communication may include at least one of communication schemes including Long-Term Evolution (LTE), LTE advance (LTE-A), 5th generation (5G) communication, Code Division Multiple Access (CDMA), Wideband CDMA (WCDMA), universal mobile telecommunications system (UMTS), Wireless Broadband (WiBro), Global System for Mobile Communications (GSM), Time Division Multiple Access (TDMA), Wireless Fidelity (Wi-Fi), Wi-Fi Direct, Bluetooth, Near Field Communication NFC), Zigbee, and the like. The wired communication may include at least one of communication schemes including Ethernet, optical network, Universal Serial Bus (USB), Thunderbolt, and the like.

The third electronic apparatus 1200 may receive the classification network trained from the second electronic apparatus 1100. The received classification network 200 may be stored in the memory 1220 of the third electronic apparatus 1200. In an embodiment, the second electronic apparatus 1100 may include the processor 1110, the memory 1120, and the communicator 1150. In an embodiment, the processor 1110 may include the data trainer 100. In an embodiment, the memory 1120 may store the classification network 200. The data trainer 100 may train the classification network 200. The data trainer 100 may train the classification network 200 through training image. Specifically, the data trainer 100 may input the training image to the classification network 200, and train the classification network 200, based on a class score output from the classification network 200 and an activation map output from the classification network 200.

Each of the second electronic apparatus 1100 and the third electronic apparatus 1200 may be a sever, a data center, a cloud server, a workstation, a mobile device, a smart phone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, a set top box, a smart speaker, an intelligent speaker, a game console, a television, a refrigerator, an air conditioner, an air purifier, a smart mirror, a smart window, an electronic frame, and the like. The wearable device may be a smart watch, a ring, a bracelet, an anklet, a necklace, glasses, a contact lens, a head-mounted device (HMD), a skin pad, an electronic tattoo, or a bio-implantable type circuit, or the like.

Referring to FIG. 13B, in an embodiment, the third electronic apparatus 1200 may include a communicator 1250. The communicator 1250 may receive an input image data_input from an external apparatus 1300.

The external apparatus 1300 may include a processor 1310, a memory 1320, an image sensor 1330, a display 1340, and a communicator 1350. Descriptions of the processor 1110 or 1210, the memory 1120 or 1220, the image sensor 1230, the display 1240, and the communicator 1150 or 1250, which are described above, may be applied to the processor 1310, the memory 1320, the image sensor 1330, the display 1340, and the communicator 1350 of the external apparatus 1300.

When an input image data_input is acquired through the image sensor 1330, the external apparatus 1300 may transmit the input image data_input to the third electronic apparatus 1200 through the communicator 1350.

When the input image data_input is received through the communicator 1250, the processor 1210 may input the input image data_input to the classification network 200. In an embodiment, the processor 1210 may include a data processor 300. The data processor 300 may input the received input image data_input to the classification network 200. The data processor 300 may acquire a class score score_class representing a score with which an object included in the input image data_input is matched to each of a plurality of classes through the classification network 200. Also, the processor 1210 may control the communicator 1250 to transmit, to the external apparatus 1300, a classification result obtained by classifying an object as a class corresponding to a highest score among scores included in a class score score_class output from the classification network 200.

When the classification result is received through the communicator 1350, the external apparatus 1300 may display the classification result on the display 1340. The external apparatus 1300 may be a mobile device, a smartphone, a PC, or the like. However, the present disclosure is not limited thereto, and the external apparatus 1300 may be one of the above-described examples of the second electronic apparatus 1100 and the third electronic apparatus 1200. The third electronic apparatus 1200 may be a server. However, the present disclosure is not limited thereto, and the third electronic apparatus 1200 may be modified as various embodiments.

Figure 14:
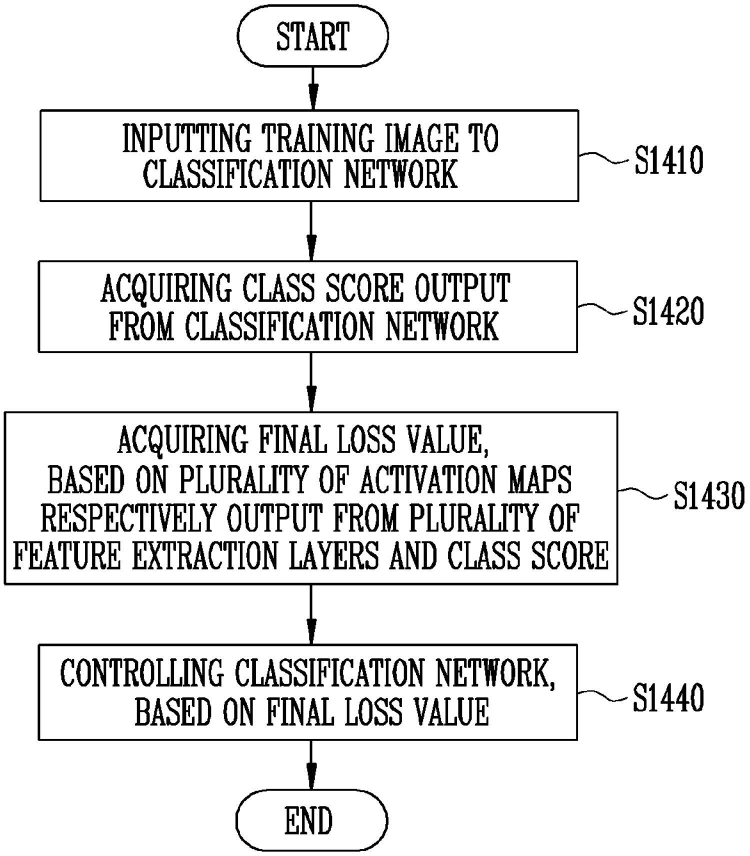
FIG. 14 is a diagram illustrating an operating method of an electronic apparatus in accordance with an embodiment of the present disclosure.

FIG. 14 is a diagram illustrating an operating method of an electronic apparatus in accordance with an embodiment of the present disclosure.

Referring to FIG. 14, the operating method of the electronic apparatus may include: step S1410 of inputting a training image data_TR to a classification network 200 including a plurality of feature extraction layers 210-1 to 210-N; step S1420 of acquiring a class score score_class output from the classification network 200; step S1430 of acquiring a final loss value loss_f, based on a plurality of activation maps AM_1 to AM_N respectively output from the plurality of feature extraction layers 210-1 to 210-N and the class score score_class; and step S1440 of controlling the classification network, based on the final loss value loss_f.

Specifically, a training image data_TR may be input to the classification network 200 (S1410). In addition, a class score class_score output from the classification network 200 may be acquired (S1420). When an image including an object is input, the classification network 200 may be configured to output a class score score_class corresponding to the object. For example, the classification network 200 may include an extraction model 210 and a classification model 220. The extraction model 210 may include a plurality of feature extraction layers 210-1 to 210-N. The classification model 220 may include a fully connected layer 221 and a softmax layer 222.

In addition, a final loss value loss_f may be acquired based on a plurality of activation maps AM_1 to AM_N and the class score score_class (S1430).

In an embodiment, an activation map loss value loss_AM may be acquired based on the plurality of activation maps AM_1 to AM_N.

In a specific embodiment, a size of each of the plurality of activation maps AM_1 to AM_N may be scaled, thereby acquiring scaled activation maps. Each of the scaled activation maps may have a size equal to a size of the training image. In addition, each of the scaled activation maps and a binary image data_TRB corresponding to the training image data_TR may be input to a loss function, thereby acquiring segmentation values loss_seg1 to loss_segN. For example, a first segmentation value loss_seg1 may be acquired by calculating the loss function to which a first scaled activation map among the scaled activation maps and the binary image data_TRB are applied, and a second segmentation value loss_seg2 may be acquired by calculating the loss function to which a second scaled activation map among the scaled activation maps and the binary image data_TRB are applied. In this manner, the segmentation values loss_seg1 to loss_segN with respect to the respective scaled activation maps may be acquired. In addition, a result value obtained by performing a calculation using the segmentation values loss_seg1 to loss_segN may be acquired as an activation map loss value loss_AM. The calculation may be one of a sum calculation, a weight calculation, and an average calculation.

In an embodiment, a softmax loss value loss_softmax may be acquired based on the class score score_class. The class score score_class may be output data of the softmax layer 222. The softmax loss value loss_softmax may represent an error of the class score score_class.

In a specific embodiment, the softmax loss value loss_softmax may be acquired by inputting, to the loss function, the class score score_class and a reference score score_t corresponding to the object. For example, the softmax loss value loss_softmax may be acquired by calculating the loss function to which the class score score_class and the reference score score_t are applied. The reference score score_t may be predetermined with respect to the object included in the training image data_TR.

In an embodiment, a final loss value loss_f may be acquired based on the activation map loss value loss_AM and the softmax loss value loss_softmax.

In a specific embodiment, a result value obtained by performing a weight calculation using the activation map loss value loss_AM and the softmax loss value loss_softmax may be acquired as the final loss value loss_f. The weight calculation may be a calculation of multiplying the activation map loss value loss_AM and the softmax loss value loss_softmax respectively by different weighted values $\alpha$ and $1-\alpha$, and adding up the activation map loss value loss_AM and the softmax loss value loss_softmax. Here, a may be a value of 0 or more and 1 or less.

In addition, the classification network 200 may be controlled based on the final loss value loss_f (S1440). That the classification network 200 is controlled may mean that the classification network 200 is trained.

In an embodiment, in the step S1440 of controlling the classification network 200, at least one of a plurality of weighted parameters included in each of the plurality of feature extraction layers 210-1 to 210-N may be updated by inputting the final loss value loss_f to an output terminal of the classification network 200. That is, the final loss value loss_f may be back-propagated to the classification network 200.

In accordance with an embodiment of the present disclosure is an electronic apparatus for training a classification network having improved classification accuracy and an operating method of the electronic apparatus. In accordance with an embodiment of the present disclosure is an electronic apparatus using a classification network having improved classification accuracy While the present disclosure has been shown and described with reference to example embodiments, it will be understood by those skilled in the art that various changes in form and details may be made to these embodiments without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or some of the steps may be omitted. In each embodiment, steps need not be necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An electronic apparatus comprising:
- a memory configured to store a classification network including a plurality of feature extraction layers; and
- a processor configured to:
- control the classification network to calculate a class score indicating a probability which an object belongs to each of a plurality of classes in response to receiving a training image including the object;
- calculate an activation map loss value representing a same position difference between a binary image corresponding to the training image and each of a plurality of activation maps, in response to receiving the binary image, each of the plurality of activation maps is obtained by emphasizing a unique feature in data input to each of the plurality of feature extraction layers;
- calculate a softmax loss value representing an error of the class score;
- perform a training operation for the classification network based on a final loss value generated based on the activation map loss value and the softmax loss value, by inputting the final loss value to an output terminal of the classification network and updating at least one of a plurality of weighted parameters included in a convolution layer which is included in each of the plurality of feature extraction layers; and
- repeat the training operation until the final loss value becomes a threshold value or less.

2. The electronic apparatus of claim 1, wherein the plurality of feature extraction layers include:
- a first feature extraction layer outputting a first activation map with respect to the training image among the activation maps; and
- a second feature extraction layer outputting a second activation map with respect to the first activation map among the activation maps.

3. The electronic apparatus of claim 2, wherein the processor includes a scaler configured to:
- generate a first scaled activation map having a size equal to a size of the training image, based on the first activation map; and
- generate a second scaled activation map having a size equal to the size of the training image, based on the second activation map.

4. The electronic apparatus of claim 3, wherein the processor includes a loss value calculator configured to:
- calculate a first segmentation value based on the first scaled activation map and the binary image; and
- calculate a second segmentation value based on the second scaled activation map and the binary image.

5. The electronic apparatus of claim 4, wherein the loss value calculator is configured to generate the activation map loss value by performing a calculation using the first segmentation value and the second segmentation value, and
- wherein the calculation is one of a sum calculation, a weight calculation, and an average calculation.

6. The electronic apparatus of claim 5, wherein the loss value calculator is configured to generate the final loss value by performing a weight calculation using the activation map loss value and the softmax loss.

7. The electronic apparatus of claim 6, wherein the processor includes a data calculator configured to train at least one of the first feature extraction layer and the second feature extraction layer by inputting the final loss value to an output terminal of the classification network.

8. The electronic apparatus of claim 5, wherein the classification network includes a fully connected layer connected in series to a feature extraction layer in a last order among the plurality of feature extraction layers and a softmax layer connected in series to the fully connected layer, and wherein the loss value calculator is configured to calculate the softmax loss value based on the class score and a reference score corresponding to the object.

9. The electronic apparatus of claim 4, wherein the training image includes pixel values of a first color channel, pixel values of a second color channel, and pixel values of a third color channel, and wherein the processor includes a binary processor configured to:

calculate an average value of a pixel value of the first color channel, a pixel value of the second color channel, and a pixel value of the third color channel, which represent the same position, among the pixel values of the first color channel, the pixel values of the second color channel, and the pixel values of the third color channel; and generate the binary image by processing a pixel value corresponding to the position as a first value when the average value is less than a threshold value, and processing the pixel value corresponding to the position as a second value when the average value is equal to or greater than the threshold value.

10. The electronic apparatus of claim 2, wherein the first feature extraction layer includes a first convolution layer and a first activation function layer, which are connected in series, and wherein the second feature extraction layer includes a pooling function, a second convolution layer, and a second activation function layer, which are connected in series.

11. An electronic apparatus comprising:

a memory storing a classification network that includes a plurality of feature extraction layers and is trained to classify an object included in an image; and a processor configured to:

control the classification network to calculate a class score indicating a probability which the object belongs to each of a plurality of classes in response to receiving a input image including the object;

calculate an activation map loss value representing a same position difference between a binary image corresponding to the input image and each of a plurality of activation maps, in response to receiving the binary image, each of the plurality of activation maps is obtained by emphasizing a unique feature in data input to each of the plurality of feature extraction layers;

calculate a softmax loss value representing an error of the class score;

calculate a final loss value based on the activation map loss value and the softmax loss value;

perform a training operation for the classification network based on the final loss value, by inputting the final loss value to an output terminal of the classification network and updating at least one of a plurality of weighted parameters included in a convolution layer which is included in each of the plurality of feature extraction layers; and repeat the training operation until the final loss value becomes a threshold value or less, wherein the trained classification network is a neural network trained based on the final loss value which is a result of a weight calculation of the softmax loss value corresponding to the input image input to the classification network and the activation map loss value.

12. The electronic apparatus of claim 11, wherein each of the plurality of feature extraction layers includes the convolution layer and an activation function layer, which are connected in series, and wherein at least one of the plurality of weighted parameters is updated based on the final loss value.

13. The electronic apparatus of claim 11, wherein the activation map loss value is a sum of segmentation values generated by applying a loss function to each of the activation maps of which size is adjusted to equal to a size of the training image and a binary image corresponding to the training image.

14. The electronic apparatus of claim 11, wherein the trained classification network includes a fully connected layer connected in series to a feature extraction layer in a last order among the plurality of feature extraction layers and a softmax layer connected in series to the fully connected layer.

15. The electronic apparatus of claim 11, wherein the input image include pixel values of a first color channel, pixel values of a second color channel, and pixel values of a third color channel.

16. The electronic apparatus of claim 11, further comprising:

an image sensor configured to generate the input image including the object; and a display configured to display information, wherein the processor is configured to control the display to display a result obtained by classifying the object included in the input image as a class corresponding to a highest score among scores included in the class score.

17. The electronic apparatus of claim 11, comprising a communicator configured to receive the input image from an external apparatus, wherein the processor is configured to control the communicator to transmit, to the external apparatus, a result obtained by classifying the object included in the input image as a class corresponding to a highest score among scores included in the class score.

18. A method of operating an electronic apparatus, the method comprising:

inputting a training image including an object to a classification network including a plurality of feature extraction layers;

calculating a class score indicating a probability which the object belongs to each of a plurality of classes, which is output from the classification network;

calculating an activation map loss value representing a same position difference between a binary image corresponding to the training image and each of a plurality of activation maps, in response to receiving the binary image, each of the plurality of activation maps is obtained by emphasizing a unique feature in data input to each of the plurality of feature extraction layers;

calculating a softmax loss value representing an error of the class score;

calculating a final loss value based on the activation map loss value and the softmax loss value;

performing a training operation for the classification network based on the final loss value, by inputting the final loss value to an output terminal of the classification network and updating at least one of a plurality of weighted parameters included in a convolution layer which is included in each of the plurality of feature extraction layers; and repeating the training operation until the final loss value becomes a threshold value or less.

19. The method of claim 18, wherein the calculating an activation map loss value includes:

generating scaled activation maps by scaling a size of each of the activation maps to be equal to a size of the training image;

calculating segmentation values based on each of the scaled activation maps and the binary image corresponding to the training image; and generating the activation map loss value by performing a calculation using the segmentation values, wherein the calculation is one of a sum calculation, a weight calculation, and an average calculation.

20. The method of claim 19, wherein, in the calculating of the final loss value, the final loss value is a result value of a weight calculation using the activation map loss value and the softmax loss value.

* * * * *